United States Patent
Gale et al.

(10) Patent No.: US 12,124,740 B2
(45) Date of Patent: Oct. 22, 2024

(54) SELECTIVE HARD AND SOFT REWRITES

(71) Applicant: International Business Machines Corporation, Armonk, NY (US)

(72) Inventors: Ernest Stewart Gale, Tucson, AZ (US); Roy Cideciyan, Rueschlikon (CH); Simeon Furrer, Altdorf (CH); Masayuki Iwanaga, Urayasu (JP); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/971,675

(22) Filed: Oct. 24, 2022

(65) Prior Publication Data

US 2024/0134565 A1    Apr. 25, 2024
US 2024/0231683 A9    Jul. 11, 2024

(51) Int. Cl.
*G06F 3/06*      (2006.01)

(52) U.S. Cl.
CPC .......... *G06F 3/0659* (2013.01); *G06F 3/0619* (2013.01); *G06F 3/064* (2013.01); *G06F 3/0676* (2013.01)

(58) Field of Classification Search
CPC ...... G06F 3/0619; G06F 3/064; G06F 3/0659; G06F 3/0676; G11B 20/1883; G11B 20/1886

See application file for complete search history.

(56) References Cited

U.S. PATENT DOCUMENTS 3,638,185 A * 1/1972 Dell ............... G06K 17/00
5,349,611 A * 9/1994 Varian ............. H04L 7/043
                                             380/46

(Continued)

FOREIGN PATENT DOCUMENTS

JP         03137876 A      6/1991
TW      200302455 A      8/2003

(Continued)

OTHER PUBLICATIONS

Mense et al., "Read-Write-Codes: An Erasure Resilient Encoding System for Flexible Reading and Writing in Storage Networks", In Symposium on Self-Stabilizing Systems (pp. 624-639), (Nov. 2009). Springer, Berlin, Heidelberg.

(Continued)

*Primary Examiner* — Larry T Mackall
(74) *Attorney, Agent, or Firm* — Yee & Associates, P.C.

(57) ABSTRACT

The present disclosure includes systems and methods for reducing rewrite overhead in a sequential access storage system. The method may comprise writing a data set to a sequential access medium using a magnetic head, wherein the data set comprises a plurality of encoded data blocks, classifying each of the plurality of encoded data blocks on the sequential access medium into one of at least three classes of write quality, and rewriting the encoded data blocks in a rewrite area of the sequential access medium based at least in part on the write quality class. In some embodiments, the at least three classes of write quality may comprise a hard rewrite class for which rewrites are necessary to prevent data loss, a soft rewrite class for which rewrites are desirable but not necessary, and a no rewrite class for which no rewrite is needed or desired.

19 Claims, 12 Drawing Sheets

(56) References Cited

U.S. PATENT DOCUMENTS

| | | | |
|---|---|---|---|
| 5,379,415 A * | 1/1995 | Papenberg | G06F 11/1604 |
| | | | 714/E11.069 |
| 8,259,405 B2 | 9/2012 | Cideciyan | |
| 8,495,470 B2 | 7/2013 | Cideciyan | |
| 9,142,252 B2 | 9/2015 | Aida | |
| 9,412,410 B1 | 8/2016 | Bentley | |
| 10,242,709 B1 | 3/2019 | Yamamoto | |
| 10,339,971 B1 | 7/2019 | Butt | |
| 10,418,062 B2 | 9/2019 | Cideciyan | |
| 10,691,376 B2 | 6/2020 | Butt | |
| 10,884,653 B2 | 1/2021 | Greco | |
| 10,901,825 B2 | 1/2021 | Greco | |
| 10,937,453 B1 | 3/2021 | Butt | |
| 10,990,298 B2 | 4/2021 | Greco | |
| 2002/0124225 A1* | 9/2002 | Marchant | G11B 20/1202 |
| | | | 714/764 |
| 2003/0142428 A1 | 7/2003 | Jauette | |
| 2003/0227474 A1 | 12/2003 | Oetzel | |
| 2004/0130982 A1 | 7/2004 | Lee | |
| 2005/0128625 A1 | 6/2005 | Jaquette | |
| 2007/0041113 A1* | 2/2007 | Mojica | G11B 27/36 |
| | | | 360/77.12 |
| 2009/0316551 A1 | 12/2009 | Shu | |
| 2022/0147392 A1 | 5/2022 | Choi | |

FOREIGN PATENT DOCUMENTS

| | | |
|---|---|---|
| TW | 200401267 A | 1/2004 |
| TW | 202219763 A | 5/2022 |

OTHER PUBLICATIONS

The International Search Report and the Written Opinion of the International Searching Authority, International application No. PCT/IB2023/059340, Date of mailing Jan. 4, 2024 (Apr. 1, 2024), 11 pages.

Taiwan Intellectual Property Office Notice of Allowance, dated Jun. 3, 2024, regarding Application No. 112119816, 6 pages.

* cited by examiner

SELECTIVE HARD AND SOFT REWRITES

BACKGROUND

The present disclosure relates to data storage systems, and more particularly, the disclosure relates to selective rewrites of codewords in a data storage system.

The development of the EDVAC computer system of 1948 is often cited as the beginning of the computer era. Since that time, data processing systems (DPS) have evolved into extremely complicated devices. Today's DPS typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

These increased capabilities have caused an explosion of data, which is commonly stored in non-volatile storage systems. Magnetic storage systems are a type of non-volatile storage system in which magnetic transducers read data from and write data onto magnetic recording media. Data may be written on the magnetic recording media by positioning a magnetic recording transducer to a location over the media onto which the data is to be stored. The magnetic recording transducer may then generate a magnetic field that reversibly encodes the data into the magnetic media. Data may subsequently be read from the media by positioning the magnetic read transducer over the data location and then sensing a magnetic field originating from the magnetic media. Read and write operations may be independently synchronized with the movement of the media to ensure that the data can be read from and written to the desired location on the media.

For many years, tape storage has offered advantages in terms of cost and storage density compared to other storage technologies, such as magnetic disk storage or solid-state storage. In tape storage, the data may be encoded onto a sequential access medium (e.g., a magnetic tape) in data sets (DS), where a DS generally refers an internal physical data block on the tape. A "user data segment," in turn, generally refers to the chunk of data that a user is interested in storing with integrity.

A cloud drive refers generally to a type of tape storage in which the user data segments are protected by some scheme outside the tape drive (e.g., error correction code (or "ECC") encoding with different shards of the ECC-encoded data sent to different tapes, duplicate copies of the data sent to different tapes, etc.). Such protection schemes are typically designed to survive a specified level of loss (e.g., the loss of "n" numbers of data blocks).

SUMMARY

According to embodiments of the present disclosure, a system comprising: a magnetic head and a controller communicatively coupled to the magnetic head. The controller may be adapted to write, using the magnetic head, a data set to a sequential access medium, the data set comprising a plurality of encoded data blocks. The one or more controllers may also be adapted to classify the encoded data blocks into three or more classes of write quality. The one or more controllers may also be adapted to selectively rewrite one or more of the encoded data blocks in a rewrite area of the sequential access medium based at least in part on the write quality class. In some embodiments, the three or more classes of write quality comprise a hard rewrite class for which rewrites are necessary to prevent data loss, a soft rewrite class for which rewrites are desirable but not necessary, and a no rewrite class for which no rewrite is needed or desired.

According to embodiments of the present disclosure, a method for reducing rewrite overhead in a sequential access storage system. The method may comprise writing a data set to a sequential access medium using a magnetic head, wherein the data set comprises a plurality of encoded data blocks. The method may further comprise classifying each of the plurality of encoded data blocks on the sequential access medium into one of at least three classes of write quality. The method may further comprise selectively rewriting the encoded data blocks in a rewrite area of the sequential access medium based at least in part on the write quality class. In some embodiments, the at least three classes of write quality may comprise a hard rewrite class for which rewrites are necessary to prevent data loss, a soft rewrite class for which rewrites are desirable but not necessary, and a no rewrite class for which no rewrite is needed or desired.

According to embodiments of the present disclosure, a computer program product. The computer program product may comprise a computer readable storage medium having program instructions embodied therewith. The program instructions may be executable by an apparatus to cause the apparatus to write a data set to a sequential access medium using a magnetic head, wherein the data set comprises a plurality of encoded data blocks, classify each of the plurality of encoded data blocks on the sequential access medium into one of at least three classes of write quality, and selectively rewrite the encoded data blocks in a rewrite area of the sequential access medium based at least in part on the write quality class. In some embodiments, the at least three classes of write quality may comprise a hard rewrite class for which rewrites are necessary to prevent data loss, a soft rewrite class for which rewrites are desirable but not necessary, and a no rewrite class for which no rewrite is needed or desired.

According to embodiments of the present disclosure, an apparatus, comprising a controller, and logic integrated with the controller, executable by the controller, or integrated with and executable by the controller. The logic may be configured to write a data set to a sequential access medium using a magnetic head, wherein the data set comprises a plurality of encoded data blocks, classify each of the plurality of encoded data blocks on the sequential access medium into one of at least three classes of write quality, and selectively rewrite the encoded data blocks in a rewrite area of the sequential access medium based at least in part on the write quality class. In some embodiments, the at least three classes of write quality may comprise a hard rewrite class for which rewrites are necessary to prevent data loss, a soft rewrite class for which rewrites are desirable but not necessary, and a no rewrite class for which no rewrite is needed or desired.

Any of these embodiments may be implemented in a magnetic data storage system, such as a tape drive system, which may include one or more magnetic heads, a drive mechanism for passing a magnetic medium (e.g., magnetic tape) over the magnetic head, and a controller operatively coupled to the magnetic head.

Other aspects of the present disclosure will become apparent from the following detailed description, which, when taken in conjunction with the drawings, illustrate by way of example the principles of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
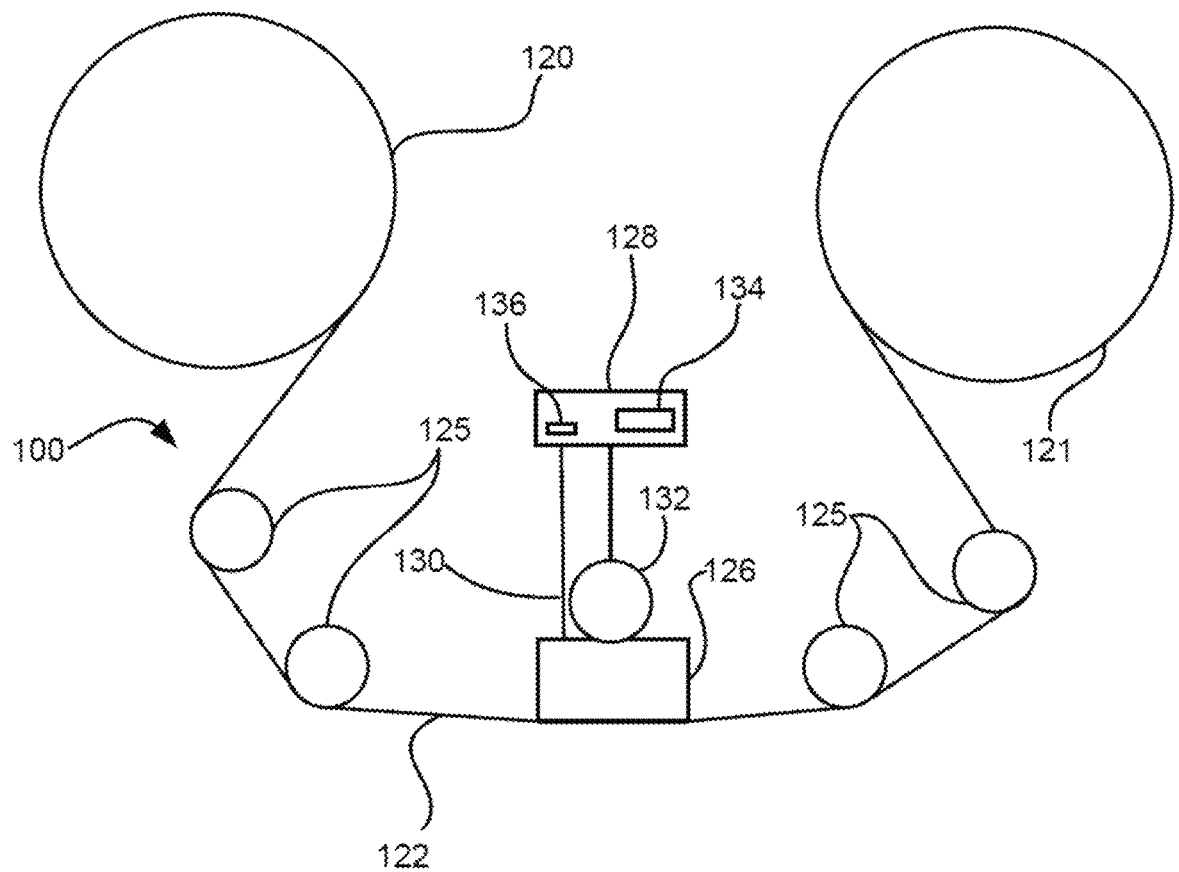
FIG. 1A is a schematic diagram of a simplified tape drive system, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Additionally, it must also be noted that, as used in the specification and the appended claims, the singular forms "a," "an" and "the" include plural referents unless otherwise specified.

A common application of tape storage is for back-up and archival storage of data "records" (which may be variable size data blocks). Typically, a host send/receives the records to/from a tape drive. The tape drive, as a sequential storage device, maps the records into data sets (DS), which are written/read to/from a tape media. The DS, in turn, generally refers to the drive's internal format for data on the tape media.

Data archival operations typically specify a high degree of reliability when accessing the DS on read-back. One technique to help provide this high reliability is a read-while-write operation. During the read-while-write operation, faulty and/or potentially faulty error correction coded (ECC)-protected data segments (referred to hereinafter as faulty "code-word interleaves" or "CWIs") may be stored in a buffer, then rewritten to the medium at the end of a data set (DS) to ensure that the data is correctly written during the write process. This feature may be desirable because it can significantly improve the reliability of the write operation. In some embodiments, a four-way interleaved data segment (or "CWI-4") may be used, and about 3% of each tape is reserved for such rewrites. In such embodiments, if rewrites exceed the 3% capacity reserve, the medium will not achieve the full listed capacity.

One way to boost the capacity of a storage medium is to lower its signal-to-noise ratio (SNR) operating point. However, at low SNR operating points, such as those specified in many "cloud tape drives," the random byte-error rate can increase rapidly, so that a significant number of "C1" codewords (e.g., Reed-Solomon Codewords with $N_1=240$ and $K_1=228$ bytes) have errors in seven or more bytes, and are therefore uncorrectable in "read-while-write" mode. Moreover, because the rewrite unit is conventionally a CWI interleave, an even larger number of C1 CWs are flagged for rewrite, which conventionally leads to an excessive number of rewrites.

One possible solution for achieving a low-SNR, high-capacity operating point is to turn off "rewrites" completely. However, disabling rewrites completely has severe potential consequences (e.g., data loss due to uncorrectable DS), or very large overheads (e.g., due to DSs having be repeated in their entirety), as many conventional implementations rely on rewrites to avoid uncorrectable datasets (e.g., to handle "stripe errors" caused by off-track/stop-write events). An alternate possible low SNR solution may permit rewrites, but because read-while-write verification is typically performed using the relatively weak C1 code to verify the write quality, the low SNR operating condition can quickly lead to an excessive number of rewrites.

Accordingly, one aspect of this disclosure is a selective rewrite method that mitigates loss of capacity due to excessive rewrites, e.g., in a cloud drive, and better takes advantage of the potential gains from iterative error correcting code (ECC) decoding. In this way, some embodiments may use iterative ECC decoding to successfully decode a Sub Data Set (SDS) in many situations, even at C1 uncorrectable rates of 50% or more.

Some embodiments may effectively and significantly reduce the rewrite overhead (e.g., for a cloud drive), while simultaneously reducing the risk of data loss, by identifying three different classes (or categories) of rewrites, e.g., by classifying rewrites into and/or distinguishing between:

Class A) Mandatory/critical rewrites, also called "hard" rewrites.
Class B) Optional/configurable rewrites, also called "soft" rewrites.
Class C) No rewrite needed.

In an example embodiment, the "unit of a rewrite" is the CWI, and all data is equal. CWIs that have been incompletely written and/or that remain unverified during first writing, e.g., because of a short stop-write event, may be classified as hard rewrites. CWIs classified as hard rewrites will always be rewritten to avoid data loss in this embodiment. In contrast, CWIs that have been verified but did not meet a desired write quality metric can be classified as soft rewrites. Soft rewrite CWIs may or may not be rewritten, depending on additional criteria or algorithms, such as space remaining in a rewrite area, specified reliability operating point, etc. Other embodiments include, without limitation, rewriting up to configurable parameter ($N_{max}$) of CWI per DS, sorting and rewriting the soft rewrites by an additional quality metric/threshold, such as, e.g., the number of RLL decoding errors in the CWI, or SNR (signal-to-noise ratio) during detection. CWIs that were written and verified successfully with a high write quality do not need to be rewritten, and hence may be classified in Class C (i.e., no rewrites needed) in some embodiments.

Accordingly, one aspect of some embodiments is a dataflow extension that allows a potentially large reduction in rewrite overheads (e.g., for a cloud drive), but at the same time reduces the potential for data loss. These technical benefits may be achieved by measuring a write quality metric for each CWI, and then using it to categorize that CWI as either a hard rewrite, a soft rewrite, or a no rewrite. The hard rewrites must be performed by the system, whereas the soft rewrites may or may not be performed, depending on factors such as space in a rewrite area, importance of the data, predefined service commitments, etc.

Some embodiments may identify and distinguish between more than three categories of rewrites, such as four or five categories. Still other embodiments may assign a priority score to rewrites of particular CWIs, and then prioritize rewrites of CWIs based on that score. The lower the estimated quality/reliability of a CWI, the higher the priority score for rewrite. Still other embodiments may identify and/or prioritize subclasses of rewrites. For example, in some embodiments, the class b) "soft" rewrite category may be split into multiple categories, such as:

Subclass B1): more than 20 RLL decoding errors;
Subclass B2): Between 6 and 20 RLL decoding errors;
Subclass B3): less than 6 RLL decoding errors.

In these embodiments, subclass B1 may be given higher priority than subclass B2, which has higher priority than subclass B3.

One technical advantage of some embodiments is that they may enable a relatively lower SNR operating point while still providing a relatively higher degree of data reliability, particularly in embodiments that utilize both row and column parity and/or where a significant percentage of the errors are readback errors. In particular, some embodiments may enable mitigation of excessive rewrites caused by random byte errors by defining one or more predetermined thresholds (e.g., "threshS" and "threshH," described in more detail below), selecting a high value for "threshS" and/or preventing avoidance of data loss due to correlated byte errors, and stopping write/dead track by selecting a low value for "threshH." Another technical advantage of some embodiments is that they can effectively and significantly reduce the rewrite overhead (e.g., by not performing rewrites classified as soft rewrites), while also mitigating the risk of data loss (e.g., by always performing rewrites classified as hard rewrites).

One feature and advantage of some embodiments is that they may enable an administrator to select a desired mode among a broad range of operating conditions and/or qualities of services, including without limitation, a relatively higher-reliability, medium-capacity mode (e.g., maximizing a reliability metric) and a relatively higher-capacity, medium-reliability mode (e.g., maximizing a capacity metric). This feature and advantage may be enabled by tuning and/or changing one or more of the predetermined thresholds (i.e., threshS and threshH) described below.

FIG. 1A illustrates a simplified tape drive 100 of a tape-based data storage system, consistent with some embodiments of the disclosure. While one specific embodiment of a tape drive is shown in FIG. 1A, it should be noted that the aspects and approaches described herein may be implemented in the context of any type of tape drive system.

As shown, a tape supply cartridge 120 and a take-up reel 121 are provided to support a tape 122, also known as magnetic tape, magnetic recording tape, tape medium, etc. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such a head may include an array of read transducers (also referred to as readers), write transducers (also known in the art as writers), or both.

Guides 125 guide the tape 122 across the tape head 126. Such a tape head 126 is in turn coupled to a controller 128 via a cable 130. The controller 128 may be or may include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under the logic disclosed herein, and thus, may be implemented as an application specific integrated circuit ("ASIC"), or using a general-purpose processor, for any of the descriptions of tape drives included herein, in various embodiments. The controller 128 may be coupled to a memory 136 in some embodiments, which may store instructions executable by the controller 128. Moreover, the controller 128 may be configured and/or programmable to perform or control some or all of the methodology presented herein. For example, the controller 128 may be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 may control a position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to a host.

Figure 1B:
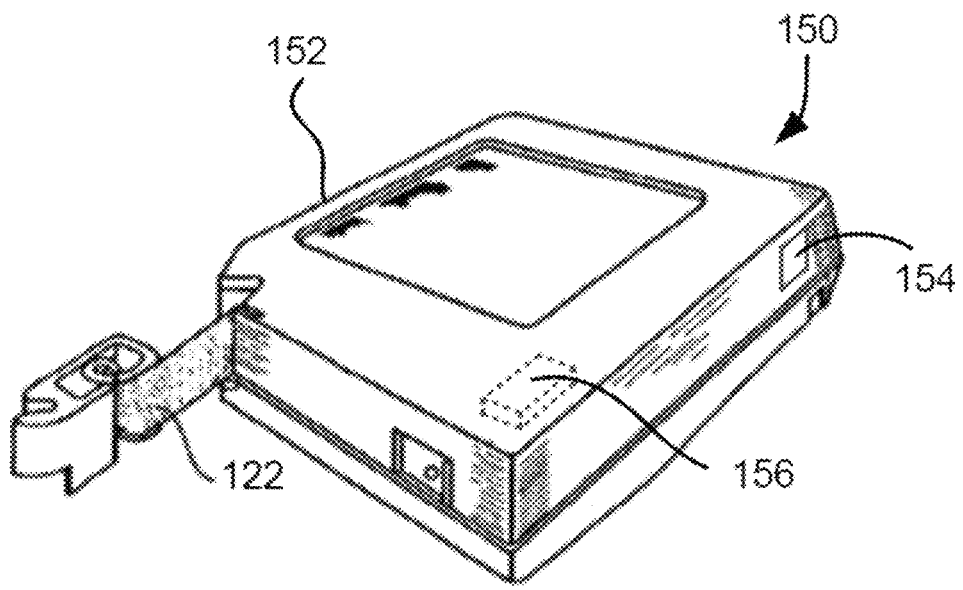
FIG. 1B is a schematic diagram of a tape cartridge, consistent with some embodiments.

FIG. 1B illustrates an example tape cartridge 150, consistent with some embodiments. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In other embodiments, the nonvolatile memory 156 may be attached to the inside or outside of the housing 152 without modification of the housing 152. For example, the nonvolatile memory 156 may be embedded in a self-adhesive label 154. In some embodiments, the nonvolatile memory 156 may be a solid-state (e.g., Flash) memory device, read-only memory (ROM) device, etc., embedded into or coupled to the inside or outside of the tape cartridge 150. The nonvolatile memory may be accessible by the tape drive and the tape operating software/the driver software, and/or another device.

Figure 2A:
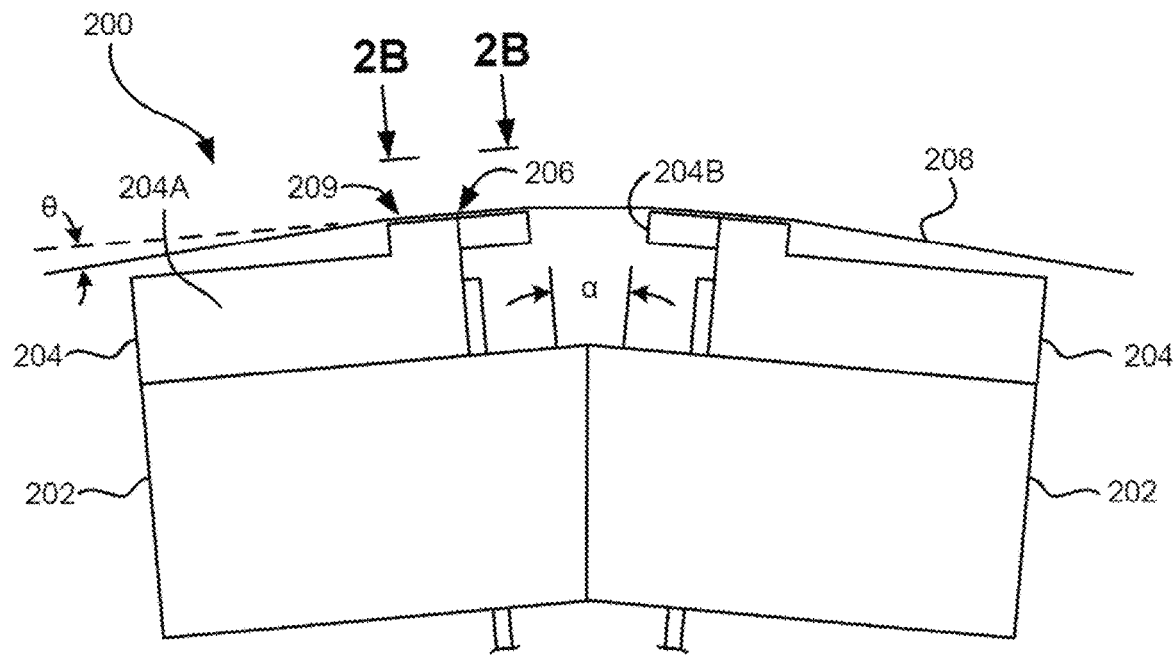
FIG. 2A illustrates a side view of a flat-lapped, bi-directional, two-module magnetic tape head, consistent with some embodiments.

By way of example, FIG. 2A illustrates a side view of a flat-lapped, bi-directional, two-module magnetic tape head 200 consistent with some embodiments. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 may be each between about 0.1 degree and about 3 degrees in some embodiments.

The substrates 204A may be constructed of a wear resistant material, such as a ceramic. The closures 204B may be made of the same or similar ceramic as the substrates 204A.

The read transducers and write transducers may be arranged in a piggyback or merged configuration. An example piggybacked configuration comprises a (magnetically inductive) write transducer on top of (or below) a (magnetically shielded) read transducer (e.g., a magneto resistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
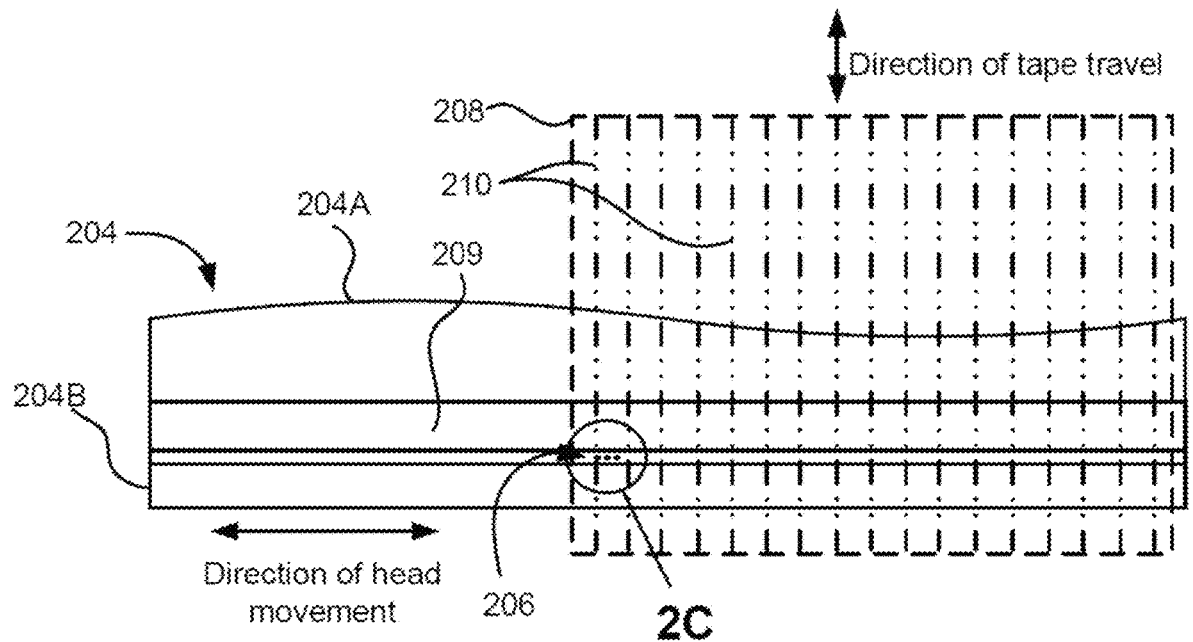
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is depicted long enough to be able to support the tape as the head steps and/or moves between data bands.

The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The signals from the servo readers are, in turn, used to keep the read transducers and/or write transducers 206 aligned with a particular set of tracks during the read/write operations.

In this example, the tape 208 includes 4 to 32 data bands, e.g., with 16 data bands and 17 servo tracks 210, as shown in FIG. 2B on a one-half inch wide tape 208. Other embodiments may use, e.g., four data bands (and, hence, five servo bands) on a one-half inch wide tape, and store two-thousand or more tracks per databand.

Figure 2C:
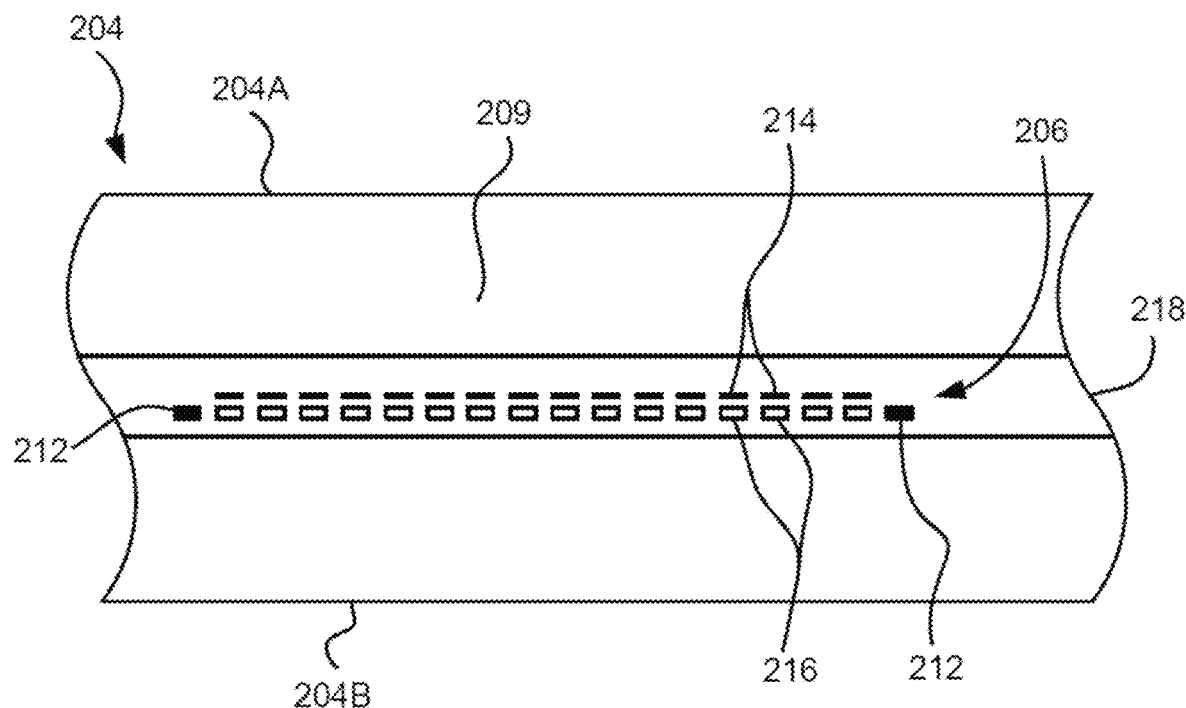
FIG. 2C is a detailed view taken from Circle 2C of FIG. 2B.

FIG. 2C depicts a plurality of read transducers and/or write transducers 206 formed in a gap 218 on the module 204 in circle 2C of FIG. 2B. As shown in FIG. 2C, the array of read transducers and write transducers 206 includes, for example, 16 write transducers 214, 16 read transducers 216 and two servo readers 212, though the number of elements may vary. Other example approaches include 8, 16, 32, 40, and 64 active read transducers and/or write transducers 206 per array, and alternatively interleaved designs having odd numbers of read transducers or write transducers such as 17, 25, 33, etc. An example approach includes 32 read transducers per array and/or 32 write transducers per array, where the actual number of transducer elements could be greater, e.g., 33, 34, etc. Multiple simultaneously operated transducers may allow the tape to travel at a modest velocity while maintaining a high data transfer rate. Lower velocities may be desirable to reduce mechanical difficulties from speed-induced tracking.

While the read transducers and write transducers may be arranged in a piggyback configuration as shown in FIG. 2C, the read transducers 216 and write transducers 214 may also be arranged in other configurations, such as an interleaved configuration. In other embodiments, each array of read transducers and/or write transducers 206 may be read transducers or write transducers only, and the arrays may contain one or more servo readers 212. As shown in FIGS. 2A-2C, each module 204 may include a complementary set of read transducers and/or write transducers 206 to permit bi-directional reading and writing, read-while-write capability, backward compatibility, etc.

Figure 2D:
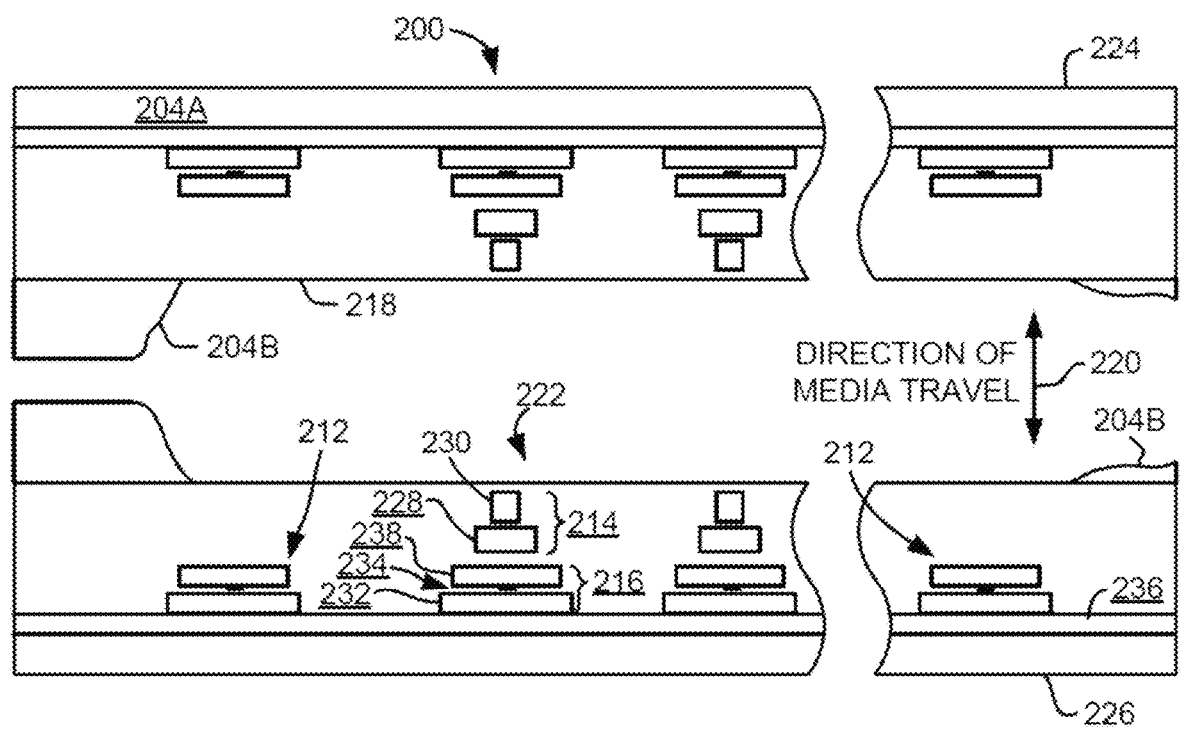
FIG. 2D is a detailed view of a partial tape bearing surface of a pair of modules.

FIG. 2D shows a partial tape bearing surface view of complementary modules of a magnetic tape head 200, consistent with some embodiments. In FIG. 2D, each module has a plurality of read/write (R/W) pairs in a piggyback configuration formed on a common substrate 204A and an optional electrically insulating layer 236. The write transducers 214 and the read transducers 216 are aligned parallel to an intended direction of travel of a tape medium thereacross to form a R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point, etc. Moreover, in a system operable for bidirectional reading and/or writing, the direction of tape travel in both directions may be parallel, and thus, both directions may be considered equivalent to each other.

Several R/W pairs 222 may be present in some embodiments, such as 8, 16, 32 pairs, etc. The R/W pairs 222 in FIG. 2D are shown linearly aligned in a direction generally perpendicular to a direction of tape travel thereacross. However, the pairs may also be aligned diagonally, etc. Servo readers 212 may be positioned on the outside of the array of R/W pairs.

In some embodiments, the magnetic tape medium may move in either a forward or reverse direction as indicated by arrow 220. The magnetic tape medium and head assembly 200 may operate in a transducing relationship. The head assembly 200 includes two thin-film modules 224 and 226 of generally identical construction.

Modules 224 and 226 may be joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers may be formed in the gap 218 created above an electrically conductive substrate 204A (partially shown), e.g., of aluminum-titanium-carbon, in generally the following order for the R/W pairs 222: an insulating layer 236; a first shield 232 comprising an iron alloy such as NiFe (e.g., ~80/20 at % NiFe, also known as permalloy), cobalt zirconium tantalum (CZT) or aluminum-iron-silicon (Sendust); a sensor 234; a second shield 238 typically of a nickel-iron alloy (e.g., permalloy); first and second writer poles 228, 230; and a coil (not shown). The sensor may be any device adapted to sense a data track on a magnetic medium, including without limitation, magneto resistive (MR) sensors, giant magneto resistive (GMR) sensors, anisotropic magneto-resistive (AMR) sensors, tunneling magnetoresistance (TMR) sensors, etc.

The first and second writer poles 228, 230 may be fabricated from high magnetic moment materials, such as cobalt-iron. Note that these materials are provided by way of example only, and other materials may be used. Additional layers, such as insulation between the shields and/or pole tips and an insulation layer surrounding the sensor may be present. Illustrative materials for the insulation include alumina and other oxides, insulative polymers, etc.

Figure 4:
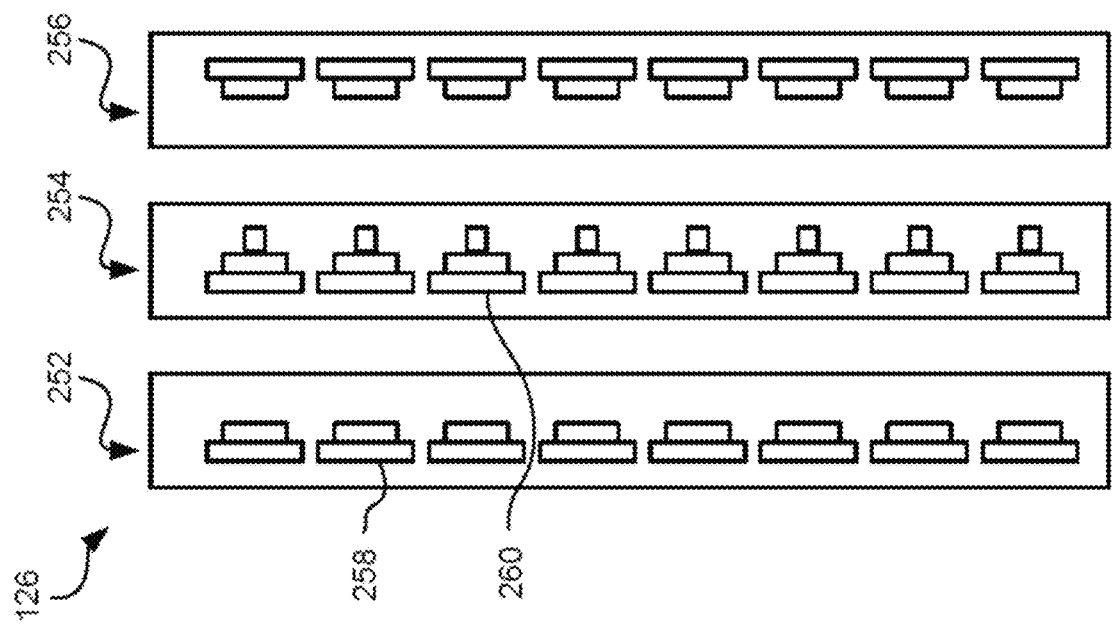
FIG. 4 is a partial tape bearing surface view of a magnetic head having a read-write-read configuration, consistent with some embodiments.
Figure 3:
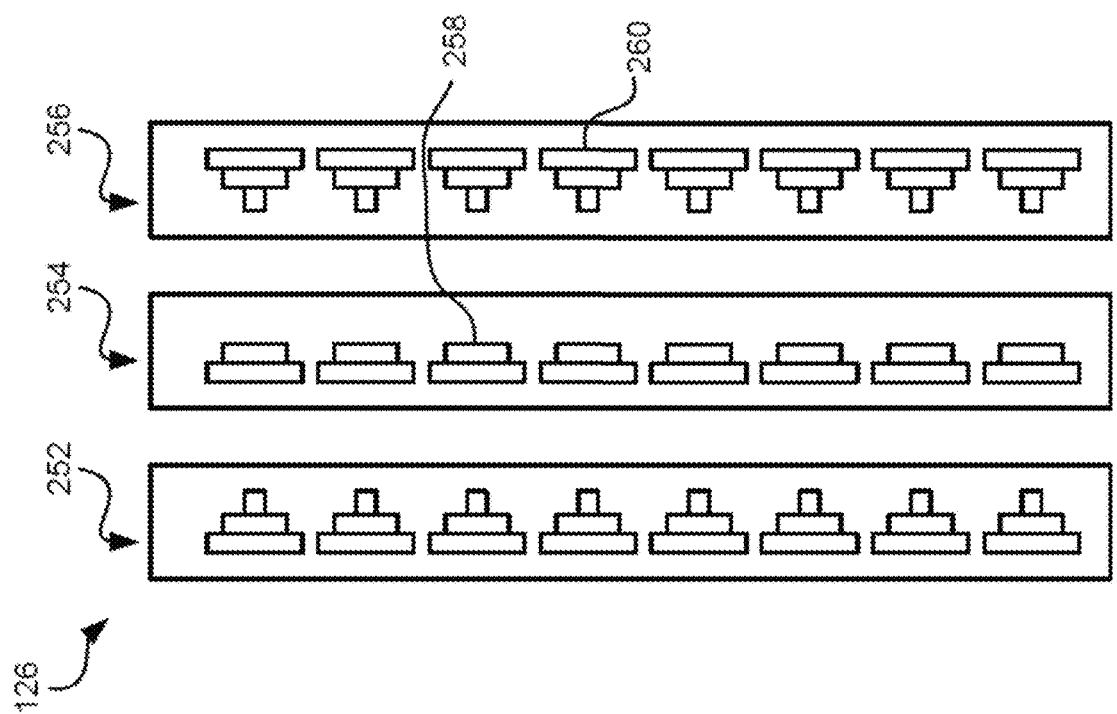
FIG. 3 is a partial tape bearing surface view of a magnetic head having a write-read-write configuration, consistent with some embodiments.

The configuration of the tape head 126 according to one approach includes multiple modules, such as three, or more in some embodiments. In a write-read-write (W-R-W) head, outer modules for writing flank one or more inner modules for reading. Referring to FIG. 3, depicting a W-R-W configuration, the outer modules 252, 256 may each include one or more arrays of write transducers 260. The inner module 254 of FIG. 3 may include one or more arrays of read transducers 258 in a similar configuration. Variations of a multi-module head include, without limitation, an R-W-R head (FIG. 4), an R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, an R-W-W-R arrangement, etc. For simplicity of explanation, a W-R-W head is used primarily herein to illustrate approaches of the present disclosure, and embodiments of the present disclosure can be applied to configurations other than a W-R-W configuration.

Advantageously, as a tape is run over a module, the tape passes sufficiently close to magnetic transducers on the module such that reading and/or writing is efficiently performed, e.g., with a low error rate.

Magnetic tapes may be stored in tape cartridges that may be, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. The Linear Tape File System (LTFS) is an example format of a file system that may be implemented in a library to enable access to compliant tapes. It should be appreciated that various approaches herein can be implemented with a wide range of file system formats. However, to provide a context, and solely to assist the reader, some of the approaches below may be described with reference to the LTFS file system format. This has been done by way of example only, and should not be deemed limiting on the scope of this disclosure.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Conversely, to "unmount" a tape, metadata may be first written on the tape (e.g., as an index), after which the tape may be removed from the state where the LTFS is allowed to use the tape as a constituent component of a file system. The tape may then be "unthreaded." To unthread the tape, the tape may be unattached from the take-up reel and physically placed back into the inside of a tape cartridge again. The cartridge may remain loaded in the tape drive even after the tape has been unthreaded, e.g., waiting for another read and/or write request. However, in other embodiments, the tape cartridge may be unloaded from the tape drive upon the tape being unthreaded, e.g., as described above.

Magnetic tape is a sequential access medium. Thus, new data is written to the tape by appending the data at the end of previously written data. Typically, when data is recorded in a tape having only one partition, metadata (e.g., allocation information) may be continuously appended to an end of the previously written data as it frequently updates and is accordingly rewritten to tape. As a result, the rearmost information is read when a tape is first mounted in order to access the most recent copy of the metadata corresponding to the tape. However, this may introduce a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 5:
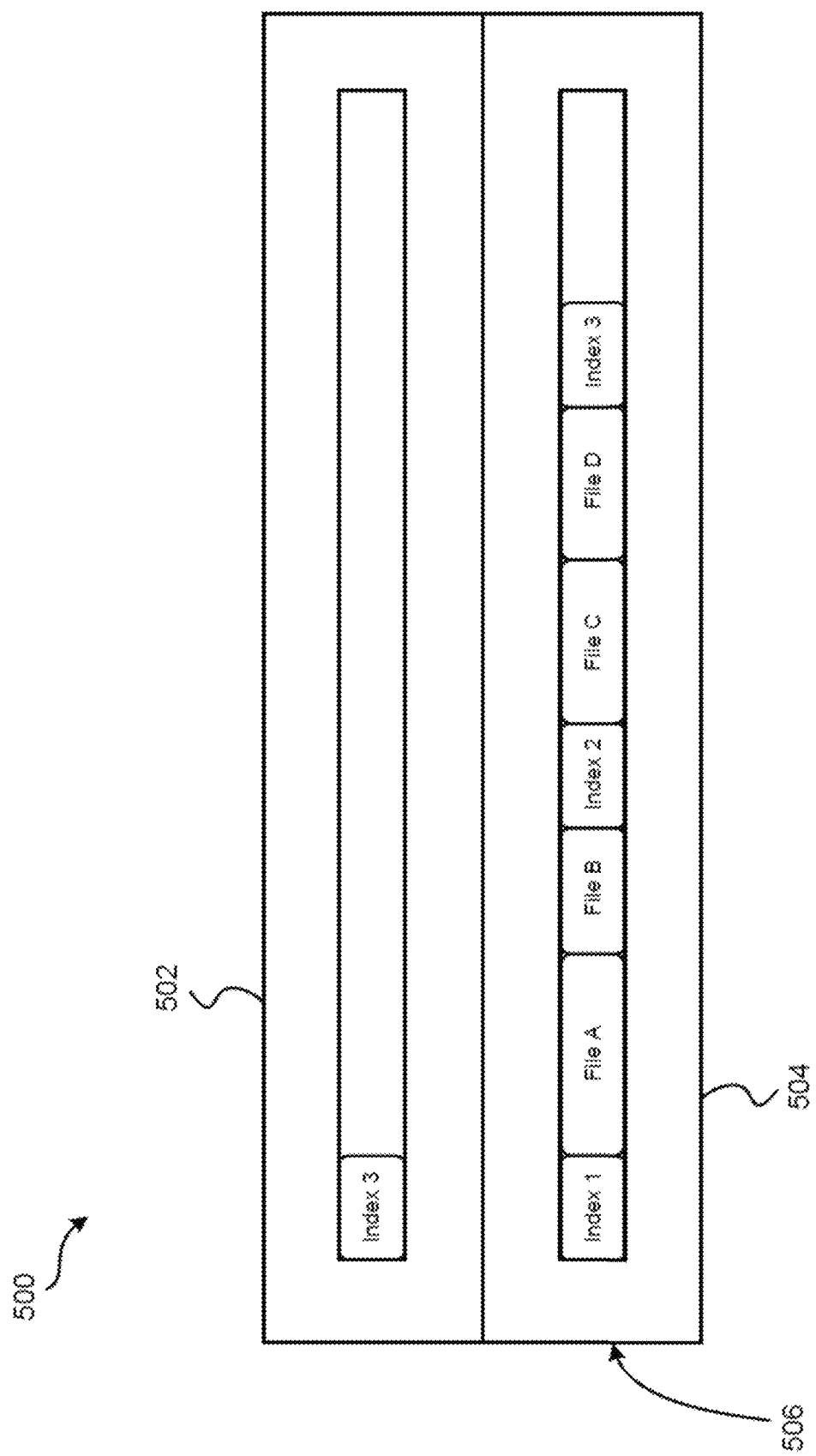
FIG. 5 is a representational diagram of files and indexes stored on a magnetic tape, consistent with some embodiments.

Turning now to FIG. 5, a representational diagram of files and indexes stored on a magnetic tape is illustrated, consistent with some embodiments. In FIG. 5, a magnetic tape 500 has an index partition 502 and a data partition 504. As shown, data files and indexes are stored on the tape. The LTFS format may be desirable because it allows for index information to be recorded in the index partition 502 at the beginning of tape 506.

As index information is updated, it may be written over the previous version of the index information, thereby allowing the currently updated index information to be accessible at the beginning of tape in the index partition. According to the specific example embodiment illustrated in FIG. 5, a most recent version of metadata Index 3 is recorded in the index partition 502 at the beginning of the tape 506. Conversely, all three version of metadata Index 1, Index 2, Index 3 as well as data File A, File B, File C, File D are recorded in the data partition 504 of the tape. Although Index 1 and Index 2 are old (e.g., outdated) indexes, because information is written to tape by appending it to the end of the previously written data as described above, these old indexes Index 1, Index 2 remain stored on the tape 500 in the data partition 504 without being overwritten.

The metadata may be updated in the index partition 502 and/or the data partition 504 the same or differently depending on the desired approach. In some embodiments, the metadata of the index and/or data partitions 502, 504 may be updated in response to the tape being unmounted, e.g., such that the index may be read quickly from the index partition when that tape is mounted again. The metadata may also be written in the data partition 504 so the tape may be mounted using the metadata recorded in the data partition 504, e.g., as a backup option.

According to one non-limiting example, a Linear Tape File System—Library Edition (LTFS LE) may be used to provide the functionality of writing an index in the data partition when a user explicitly instructs the system to do so, or at a time designated by a predetermined period (which may be set by the user, e.g., such that data loss in the event of sudden power stoppage can be mitigated). LTFS LE, in turn, generally refers to a multi-drive variant of LTFS that present each cartridge in the library as a subdirectory in the LTFS file system.

Figure 6:
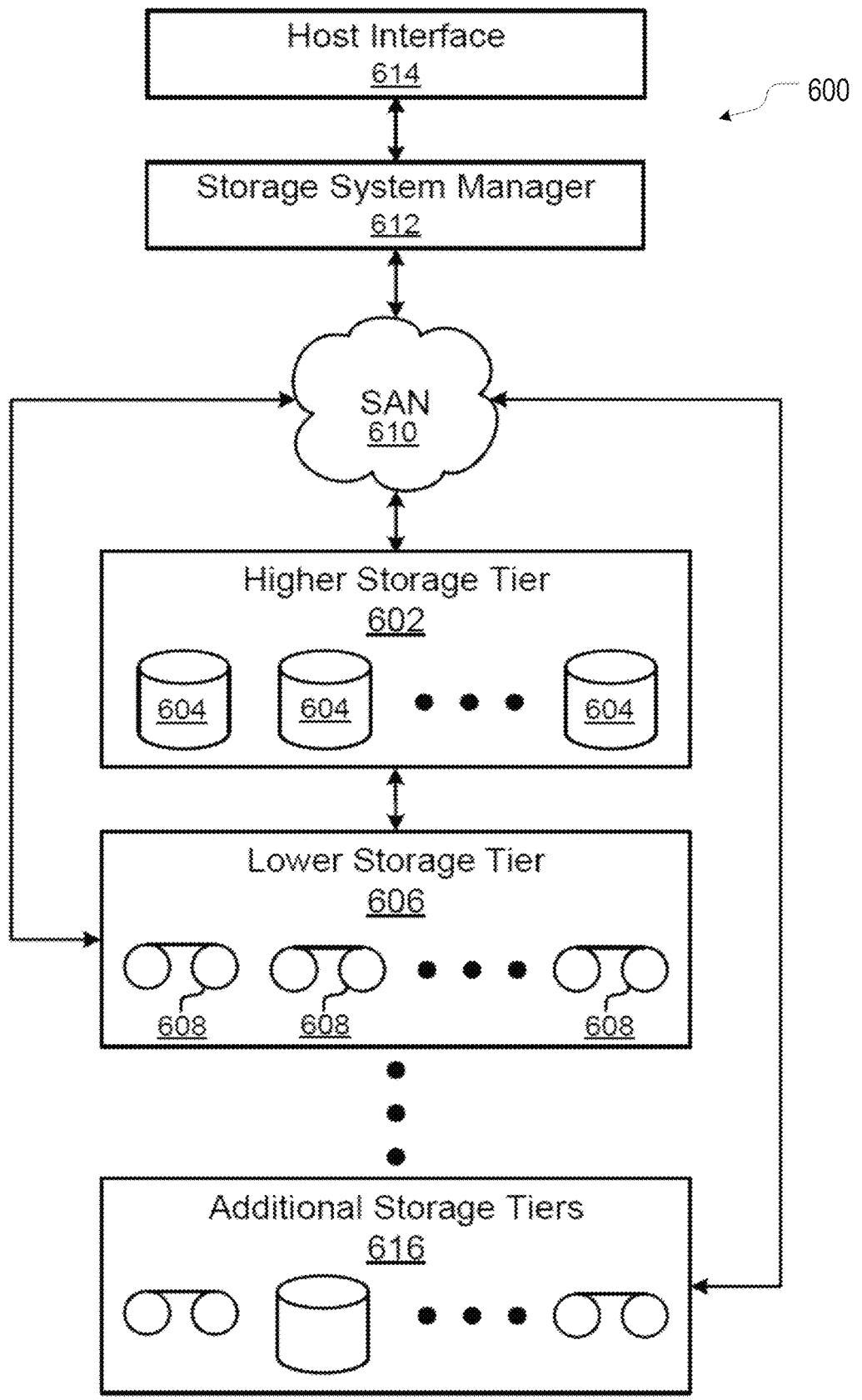
FIG. 6 is a diagram of a tiered data storage system, consistent with some embodiments.

Now referring to FIG. 6, a tiered data storage system 600 is shown, consistent with some embodiments. Note that some of the elements shown in FIG. 6 may be implemented as hardware and/or software, according to various approaches. The storage system 600 may include a storage system manager 612 for communicating with a plurality of media and/or drives on at least one higher storage tier 602 and at least one lower storage tier 606. The higher storage tier(s) 602 may include one or more random access and/or direct access media 604, such as hard disks in hard disk drives (HDDs), nonvolatile memory (NVM), solid state memory in solid state drives (SSDs), flash memory, SSD arrays, flash memory arrays, etc. The lower storage tier(s) 606 may include one or more lower performing storage media 608, including sequential access media such as magnetic tape in tape drives and/or optical media, slower accessing HDDs, slower accessing SSDs, etc. One or more additional storage tiers 616 may include any combination of storage memory media as desired by a designer of the system 600. Also, any of the higher storage tiers 602 and/or the lower storage tiers 606 may include some combination of storage devices and/or storage media.

The storage system manager 612 may communicate with the drives and/or storage media 604, 608 on the higher storage tier(s) 602 and lower storage tier(s) 606 through a network 610, such as a storage area network (SAN), as shown in FIG. 6, or some other suitable network type. The storage system manager 612 may also communicate with one or more host systems (see FIG. 7) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In some embodiments, the storage system 600 may include any number of data storage tiers and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one non-limiting example, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606.

According to some approaches, the storage system (such as storage system 600) may include logic configured to receive a request to open a data set, logic configured to determine if the requested data set is stored to a lower storage tier 606 of a tiered data storage system 600 in multiple associated portions, logic configured to move each associated portion of the requested data set to a higher storage tier 602 of the tiered data storage system 600, and logic configured to assemble the requested data set on the higher storage tier 602 of the tiered data storage system 600 from the associated portions.

Figure 7:
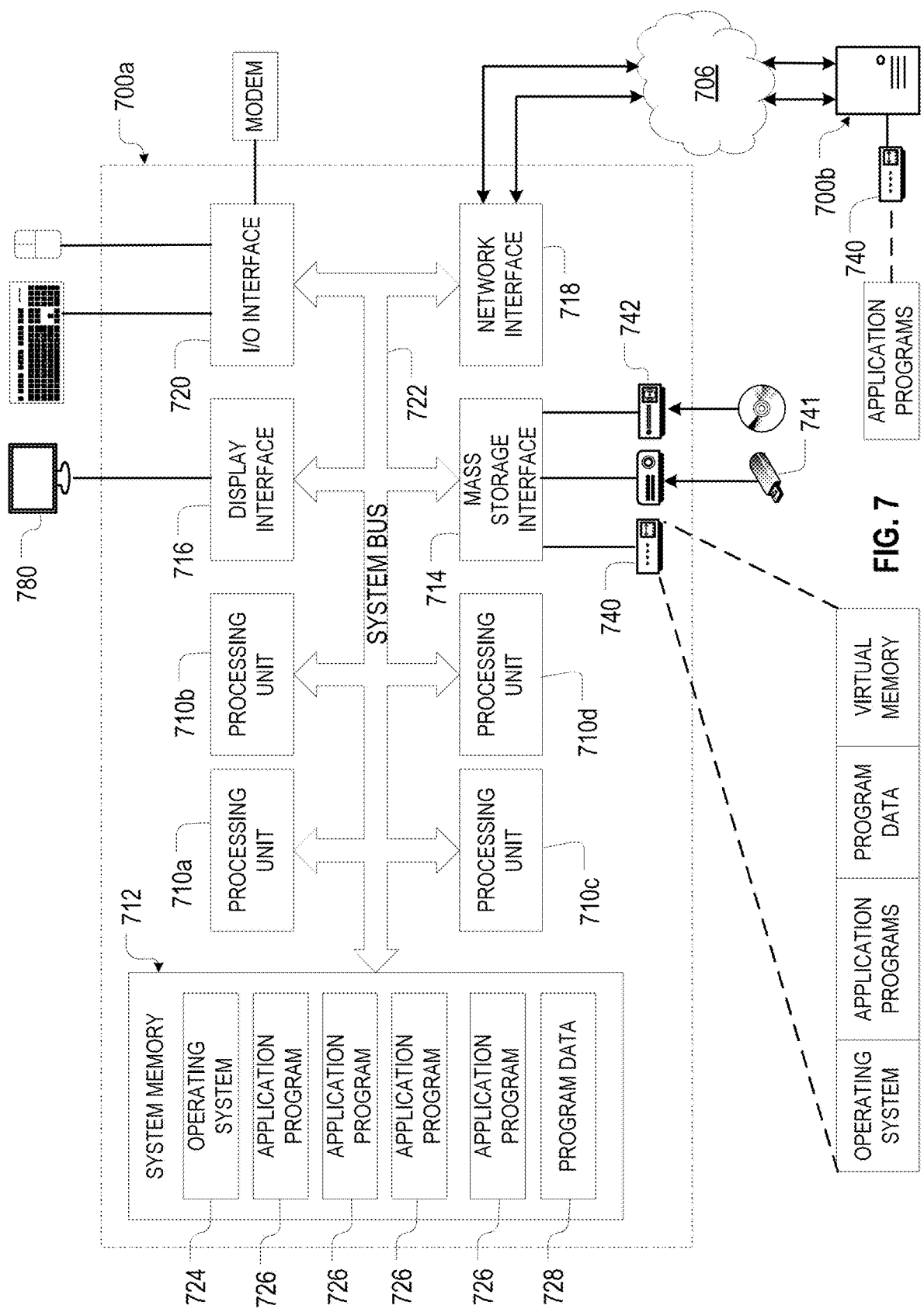
FIG. 7 illustrates an embodiment of a data processing system (DPS) suitable for use a host system, consistent with some embodiments.

FIG. 7 illustrates an embodiment of a data processing system (DPS) 700 suitable for use a host system, consistent with some embodiments. In some embodiments, the DPS 700 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 7 may be present, and that the number, type, and configuration of such components may vary. Moreover, FIG. 7 only depicts the representative major components of the DPS 700, and individual components may have greater complexity than represented in FIG. 7.

The data processing system 700 in FIG. 7 comprises a plurality of central processing units 710*a*-710*d* (herein generically referred to as a processor 710 or a CPU 710) connected to a memory 712, a mass storage interface 714, a terminal/display interface 716, a network interface 718, and an input/output ("I/O") interface 720 by a system bus 722. The mass storage interface 714 in this embodiment connects the system bus 722 to one or more mass storage devices, such as a direct access storage device 740, universal serial bus ("USB") storage device 741, or a readable/writable optical disk drive 742. The network interfaces 718 allow the DPS 700 to communicate with other DPS 700 over the communications medium 706. The memory 712 also contains an operating system 724, a plurality of application programs 726, and program data 728.

The data processing system 700 embodiment in FIG. 7 is a general-purpose computing device. Accordingly, the processors 710 may be any device capable of executing program instructions stored in the memory 712 and may themselves be constructed from one or more microprocessors and/or integrated circuits. In this embodiment, the DPS 700 contains multiple processors and/or processing cores, as is typical of larger, more capable computer systems; however, in other embodiments the computing systems 700 may comprise a single processor system and/or a single processor designed to emulate a multiprocessor system. Further, the processors 710 may be implemented using a number of heterogeneous data processing systems 700 in which a main processor is present with secondary processors on a single chip. As another illustrative example, the processor 710 may be a symmetric multi-processor system containing multiple processors of the same type.

When the data processing system 700 starts up, the associated processor(s) 710 initially execute the program instructions that make up the operating system 724, which manages the physical and logical resources of the DPS 700. These resources include the memory 712, the mass storage interface 714, the terminal/display interface 716, the network interface 718, and the system bus 722. As with the processor(s) 710, some DPS 700 embodiments may utilize multiple system interfaces 714, 716, 718, 720, and busses 722, which in turn, may each include their own separate, fully programmed microprocessors.

Instructions for the operating system, applications and/or programs (generically referred to as "program code," "computer usable program code," or "computer readable program code") may be initially located in the mass storage devices 740, 741, 742, which are in communication with the processors 710 through the system bus 722. The program code in the different embodiments may be embodied on different physical or tangible computer readable media, such as the system memory 712 or the mass storage devices 740, 741, 742. In the illustrative example in FIG. 7, the instructions are stored in a functional form of persistent storage on the direct access storage device 740. These instructions are then loaded into the memory 712 for execution by the processor 710. However, the program code may also be located in a functional form on a computer readable media that is selectively removable and may be loaded onto or transferred to the DPS 700 for execution by the processor 710.

The system bus 722 may be any device that facilitates communication between and among the processors 710; the memory 712; and the interfaces 714, 716, 718, 720. Moreover, although the system bus 722 in this embodiment is a relatively simple, single bus structure that provides a direct communication path among the system bus 722, other bus structures are consistent with the present disclosure, including without limitation, point-to-point links in hierarchical, star or web configurations, multiple hierarchical buses, parallel and redundant paths, etc.

The memory 712 and the mass storage devices 740, 741, 742 work cooperatively to store the operating system 724, the application programs 726, and the program data 728. In this embodiment, the memory 712 is a random-access semiconductor device capable of storing data and programs. Although FIG. 7 conceptually depicts that device as a single monolithic entity, the memory 712 in some embodiments may be a more complex arrangement, such as a hierarchy of caches and other memory devices. For example, the memory 712 may exist in multiple levels of caches, and these caches may be further divided by function, so that one cache holds instructions while another holds non-instruction data, which is used by the processor or processors. Memory 712 may be further distributed and associated with different processors 710 or sets of processors 710, as is known in any of various so-called non-uniform memory access (NUMA) computer architectures. Moreover, some embodiments may utilize virtual addressing mechanisms that allow the DPS 700 to behave as if it has access to a large, single storage entity instead of access to multiple, smaller storage entities such as the memory 712 and the mass storage device 740, 741, 742.

Although the operating system 724, the application programs 726, and the program data 728 are illustrated as being contained within the memory 712, some or all of them may be physically located on different computer systems and may be accessed remotely, e.g., via the communications medium 706, in some embodiments. Thus, while the operating system 724, the application programs 726, and the program data 728 are illustrated as being contained within the memory 712, these elements are not necessarily all completely contained in the same physical device at the same time and may even reside in the virtual memory of other DPS 700.

The system interfaces 714, 716, 718, 720 support communication with a variety of storage and I/O devices. The mass storage interface 714 supports the attachment of one or more mass storage devices 740, 741, 742, which are typically rotating magnetic disk drive storage devices, a solid-state storage device (SSD) that uses integrated circuit assemblies as memory to store data persistently, typically using flash memory, or a combination of the two. However, the mass storage devices 740, 741, 742 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 716 is used to directly connect one or more display units 780, such as a monitor, to the data processing system 700. These display units 780 may be non-intelligent (i.e., dumb) terminals, or may themselves be fully programmable workstations used to allow IT administrators and customers to communicate with the DPS 700. Note, however, that while the display interface 716 is provided to support communication with one or more display units 780, the computer systems 700 does not necessarily require a display unit 780 because all needed interaction with customers and other processes may occur via network interface 718.

The communications medium 706 may be any suitable network or combination of networks and may support any appropriate protocol suitable for communication of data and/or code to/from multiple DPS 700. Accordingly, the network interfaces 718 can be any device that facilitates such communication, regardless of whether the network connection is made using present day analog and/or digital techniques or via some networking mechanism of the future. Suitable communication media 706 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 706. The Transmission Control Protocol/Internet Protocol ("TCP/IP") suite contains suitable network and transport protocols.

Figure 8:
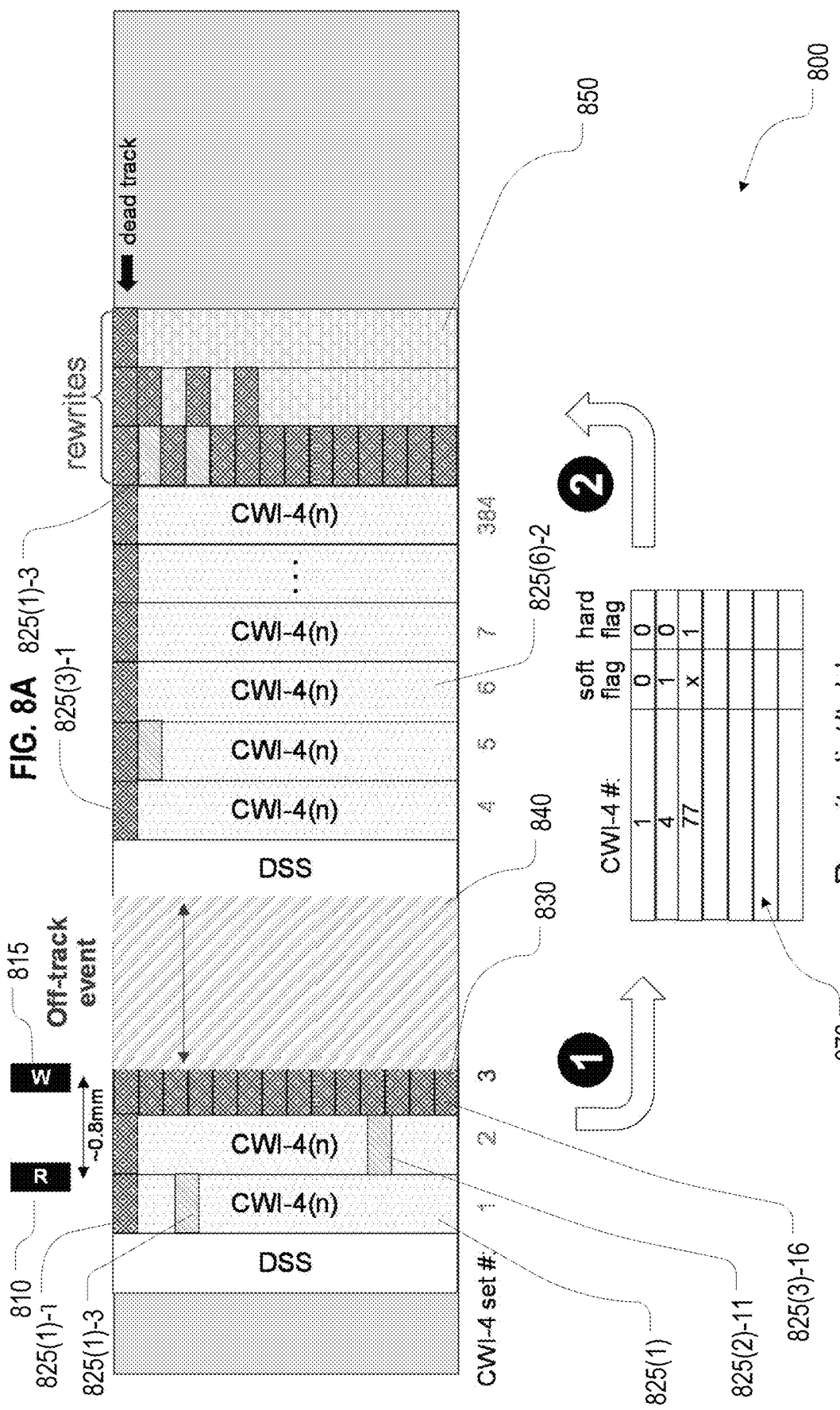
FIG. 8A is a schematic diagram of a magnetic tape configured to store a DS, consistent with some embodiments.
FIG. 8B depicts an example rewrite list table, consistent with some embodiments.

FIG. 8A is a schematic diagram of a magnetic tape 800 configured to store a data set (DS), consistent with some embodiments. The DS 800 in this example comprises a DSS (Data Set Separator sequence) at location 820 and plurality of CWI codewords sets 825(1) . . . 825(384), each comprising a plurality of CWI codewords 825(1)-1, 825(1)-2 . . . 825(384)-16, etc., such as CWI-4 codewords (only some codeword sets 825($n$) and codewords 825($n$)-$m$ labeled for clarity). For each CWI codeword 825($n$)-$m$, a write head 810 writes the associated data to the tape 800, and the data is subsequently read back by a read head 815 which enables read-while-write data verification. In this example, some of these CWI codewords 825-1-3, CWI 825-2-11, etc. will fail to verify (e.g., read back below a desired write quality metric). These unverified CWI codewords 825(1)-3, CWI 825(2)-11 may be categorized as soft rewrites, and may or may not be (re)written in a rewrite area 850, depending on additional criteria or algorithms, such as space remaining in the rewrite area 850, specified reliability operating point, etc.

Additionally in FIG. 8A, an off-track event has occurred at location 830 (again, assuming a servo position for the tape 800 is known). In response, writing is interrupted/paused until the heads 810, 815 are back at a desired track position 840. Then, writing resumes with a new DSS, etc. In this example, all of the CWIs codewords 825(3)-1 . . . 825(3)-16 in codeword set 825(3) are affected by the off-track event. These CWI codewords are uncorrectable (e.g., are incomplete/have to many byte errors due to the write stop at location 830), and thus, may be classified as "hard rewrites" that will be rewritten in the rewrite area 850.

Additionally, in FIG. 8A, a dead track event is occurring, e.g., from a faulty write head 810. In response, some embodiments may detect a string of unverified CWI codewords e.g., CWI 825(1)-1, CWI 825(2)-1, etc. greater than a predetermined length, and also classify them as "hard rewrites." In response, the affected CWI codewords will also be rewritten in the rewrite area 850. A CWI's rewrite happens on a track that is different from where it was first written.

FIG. 8A also shows CWI codewords that have been both written and verified to a predetermined write quality level e.g., CWI 825(6)-2. These CWI codewords may be categorized as "no rewrite" needed.

In operation, some embodiments may use an ECC, such as iterative C1-C2 decoding, to protect rows (i.e., CWI codewords written by the same head 810) of CWI codewords, such as CWI-4 codewords. At low SNR, almost all CWIs of a DS/SDS may be rewritten and therefore can be read from tape. Iterative decoding may be used to handle rows of CWI codewords. Iterative decoding can handle byte-error rates of up to a few percent at the input, as long as all CWIs codewords are available for decoding, e.g., have been written to tape at least once.

As a DS is first written to the tape 800, a CWI rewrite list/table may be populated with metadata (e.g., which CWI block(s) require rewrite, which type of rewrite, etc.) One example rewrite list table 870 is depicted in FIG. 8B, consistent with some embodiments. Unique identifiers for CWI codewords (shown as "1", "4", and "77" in FIG. 8B for drawing clarity, but many embodiments may use more complex identifiers) requiring rewrite (e.g., CWI 825(1)-1, CWI 825(1)-3, etc.) may be listed in a first column of table 870. A second and third column of table 870 may comprise tags indicating the CWI codeword has been identified for a "hard" or "soft" rewrite. In some embodiments, during a rewrite process, CWI codewords identified in table 870:

must be (re)written if "hard_flag" equals "true" (e.g., "1")

can be rewritten (or dropped by threshold scheme) if "soft_flag" equals "true" (e.g., "1") AND "hard_flag" equals "false" (e.g., "0")

any other combination (e.g., ELSE), no rewrite

In some embodiments, when a (pipelined) dataflow writes a DS to tape, it may create/update the list/table 870, which "flags" those CWI codewords that need to be rewritten. Some embodiments may implement these flags by extending a current "rewrite flag" from one to two bits, e.g., to comprise a "soft flag" and "hard flag."

"Hard rewrites" generally refer to those rewrites that are most important, or even necessary, to avoid data loss. Events where some CWI codewords are not written or incompletely written (and hence cannot be read/used for decoding in a reading device) are, for example: stop-write events (where writing is abruptly stopped to avoid overwriting adjacent tracks), dead tracks (due to a very poor or non-functional writer). In these events, to avoid the risk of data loss/uncorrectable DSs, some embodiments may ensure that the missing/incomplete CWIs are (re)written. These CWIs may be considered as "hard rewrites" (or mandatory/critical rewrites).

In some embodiments, a CWI codeword may be considered a "hard rewrite" if the following condition is met:

(#RLL_decoding_errors in CWI is greater than "threshH") AND ((#byte_errors is greater than "threshB") OR ("is uncorrectable"))

That is, if the total number of RLL-decoding errors in a CWI codeword (max: 243 errors in some embodiments) exceeds a first configurable/tunable threshold "threshH" (where $0 \le threshH \le 255$) and if either: (i) a number of byte errors per C1 codeword exceeds a second configurable/tunable threshold "threshB" (where $0 \le threshB \le T=255$); or (ii) the C1 codeword is uncorrectable. This double-condition may be desirable in low SNR environments where there may be more errors. In other embodiments, a CWI could be considered a "hard rewrite" if the following single-condition is met:

RLL_decoding_errors_in_CWI4>threshH

For the example C1 code above (Reed-Solomon Codewords with N1=240 and K1=228 bytes), the C1 decoder can detect/correct up to six byte errors per codeword, so threshB≤T=5 is working as expected. If there are more than six byte errors in a C1 codeword and (6≤T) then C1 decoding will fail and therefore the second condition is true: ("is uncorrectable"). Additionally, if a CWI codeword was not written/verified, e.g., due to an off-track event, then some embodiments may set the #RLL_decoding_errors_in_CWI4 variable above to 244 (i.e., a value greater than a maximum possible number of errors, or similar flag) and therefore force the CWI codeword to be classified as a "hard rewrite."

Other tests to determine a "hard rewrite" condition are within the scope of this disclosure and may be used in addition or in place of the conditions described above. For example, the CWI codewords on a "dead track" (e.g., due to a very poor or non-functional writer) may be classified as "hard rewrite" based on read channel statistics such as, e.g., mean squared error (MSE) or signal-to-noise ratio (SNR), or statistics of the C1 decoding performance, etc. Additionally, some embodiments may optionally allow for disabling rewrites (e.g., for testing) by setting the first threshold, threshH, equal to 255.

"Soft rewrites" generally refer to those rewrites that are desirable for purposes of reliability, but are unlikely to lead to data loss. In some embodiments, a CWI codeword may be classified for "soft rewrite" if it is not a "hard rewrite" AND if one of the following "soft rewrite" conditions is met:
  A) The CWI codeword has at least one C1 codeword in which the #byte_errors>threshB;
  B) #RLL_decoding_errors_in CWI>threshS; OR
  C) a combination of A) and B);
where "threshS" is a third configurable/tunable threshold and is lower than threshH.

If neither of the hard rewrite and soft rewrite conditions is met, then no rewrite is needed e.g., the CWI codeword was both written and verified.

Figure 9:
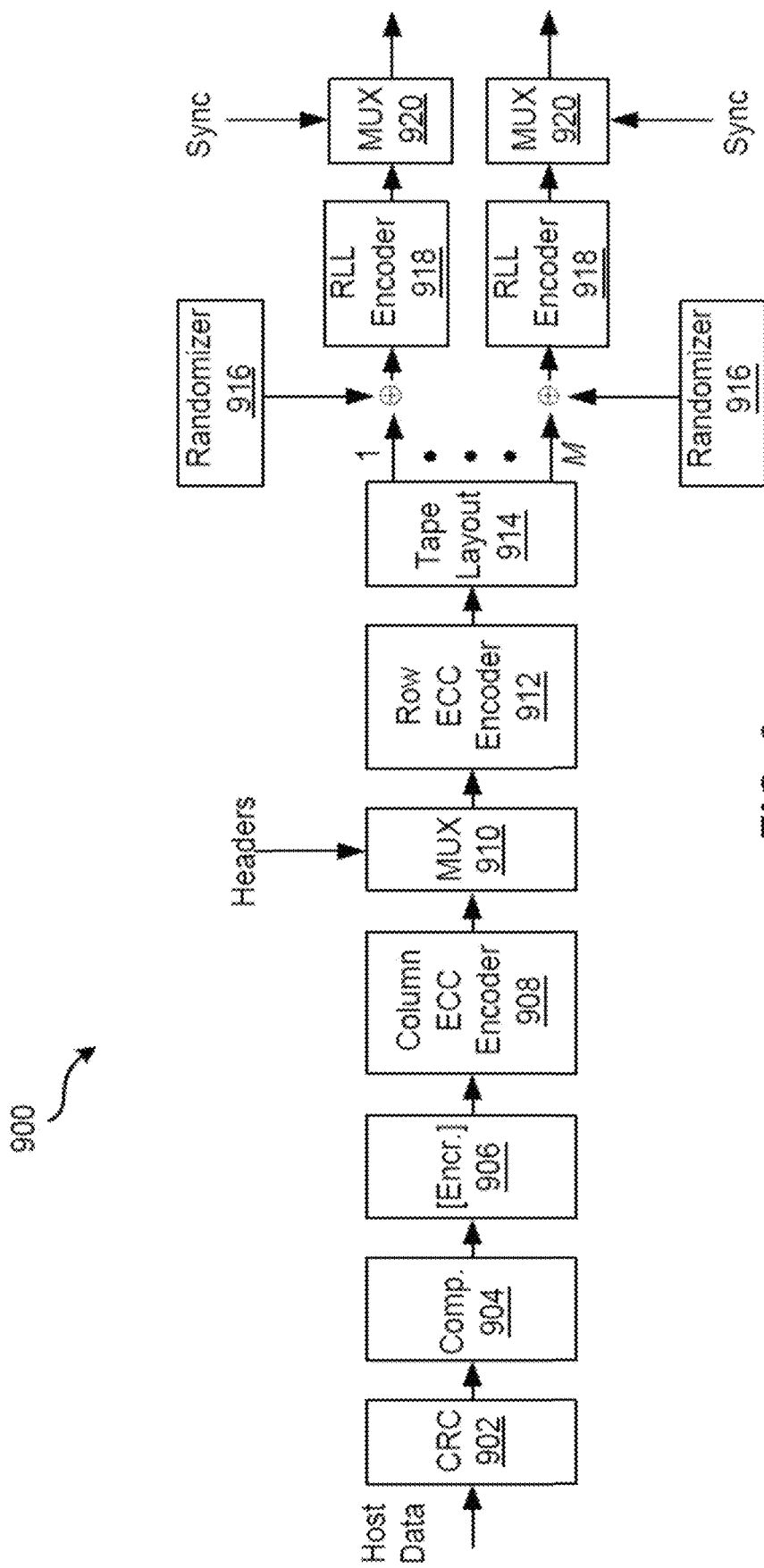
FIG. 9 is a high-level block diagram showing one example of a data flow for a tape drive, consistent with some embodiments.

FIG. 9 is a high-level block diagram showing one example data flow 900 for a tape drive, consistent with some embodiments. This data flow 900 is presented only by way of example and is not intended to be limiting. Indeed, tape drives implementing other data flows may also benefit from the rewrite techniques disclosed herein and thus are intended to be encompassed within the scope of the invention. The data flow 900 is simply presented to show one approach to performing a process for recording data to magnetic tape.

The CRC module 902 receives a sequence of bytes contained within variable-length blocks of data (also known as "records") from a host device. These blocks of data may be any size up to a maximum size supported by a tape drive. The cyclic redundancy check (CRC) module 902 may add CRC information to these blocks. A compression module 904 may then compress the blocks and an encryption module 906 may optionally encrypt the blocks. The blocks of data may then be broken into data sets of fixed size, which may in turn be broken into sub data sets (SDSs) of fixed size. Each SDS may be organized into a two-dimensional array of data and passed to a column error correction coding (ECC) encoder 908, which in turn generates parity bit(s) for each column in the data array and appends the column ECC parity to the array.

Once the column ECC parity is generated and appended to the array, a multiplexer 910 may append headers to the rows in the array. These headers may identify the location of the rows within the sub data set and larger data set in which they reside. The extended array may then be passed to a row ECC encoder 912 which generates row ECC parity (containing typically 8-bit symbols (byte), etc.) for each row in the array. In general, ECC parity symbols have n bits where n is a positive integer number. The ECC parity may be of any conventional type, e.g., C1 parity, C1' parity, etc., where C1 parity is generated from a row of an SDS and C1' parity is generated from both a row of an SDS and a header appended to the row. Therefore, C1 parity protects against faults in a row of an SDS, whereas C1' parity protects against faults both in a row of an SDS and a header appended to the row. A tape layout module 914 may then distribute the data array, the ECC parity, and the headers across M different tracks and in different orders for recording on the magnetic tape. M is typically a multiple of 8 such as 8, 16, 32, 64 etc. In general, M can be any positive integer number. The data sequences may then be processed by randomizers 916 which perform additional signal processing on the data in a conventional manner. Run length limited (RLL) encoders 918 may then transform the information so that it is better suited for magnetic recording. Multiplexers 920 may multiplex synchronization information, such as a variable frequency oscillator (VFO) sequence for timing acquisition, sync characters, or the like, into the information to enable it to be synchronized when read. The resulting data may then be sent to write drivers (not shown) which causes current to flow through recording head elements to generate magnetic flux and thereby write the data to the magnetic recording medium. In general, each of the blocks or modules to the right of the row ECC encoder 912 perform different transformations on the data to make it more suitable for magnetic recording.

Figure 10:
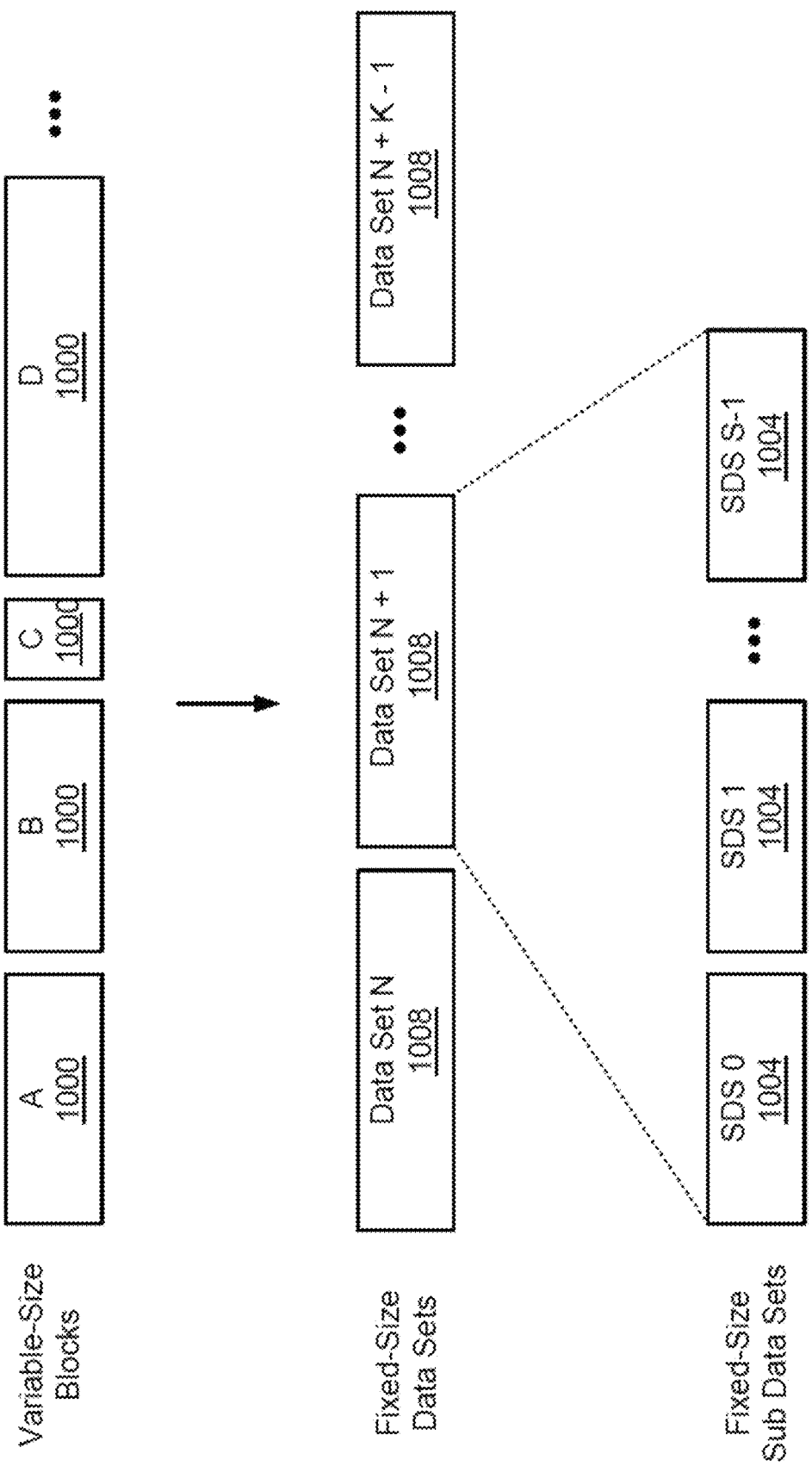
FIG. 10 is a high-level block diagram showing allocation of incoming variable-length records into DS of fixed size prior to recording the data on tape, consistent with some embodiments.

FIG. 10 is a high-level block diagram showing allocation of incoming variable-length records into DS of fixed size prior to recording the data on tape, consistent with some embodiments. In FIG. 10, a tape drive may be configured to allocate incoming variable-length records into DS 1008 of fixed size prior to recording the data on tape. The number of bytes in a DS 1008 be drive-technology-dependent and may not be visible to the host. The incoming host data may begin filling the first DS 1008 at the first byte of the DS 1008 and continues to the last byte of the DS 1008, then into subsequent DSs 1008, as needed. In certain cases, tape drives may combine multiple small host records 1000 into a single DS 1008, or may generate multiple DSs 1008 from large host records 1000. As explained above, each DS 1008 may interleave some number S of smaller fixed-size data entities referred to as sub DSs 1004 (SDSs) to improve the performance of the ECC decoder.

Figure 11:
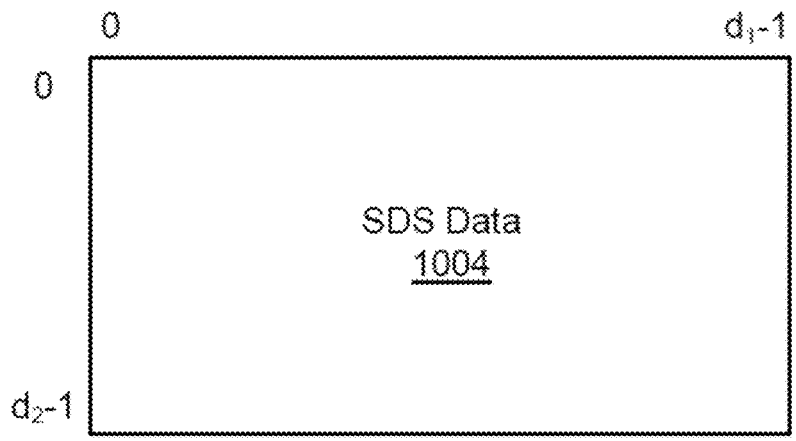
FIG. 11 is a high-level block diagram showing the data of a sub data set (SDS) organized into a two-dimensional data array, consistent with some embodiments.

FIG. 11 is a high-level block diagram showing the data of a sub data set (SDS) 1004 organized into a two-dimensional data array, consistent with some embodiments. As shown, the SDS 1004 is organized into a matrix of $d_2$ rows and $d_1$ columns. The data from a DS 1008 may fill the SDS 1004 row by row, beginning at row 0, byte 0, and continuing through row $d_2$-1, byte $d_1$-1.

Figure 12:
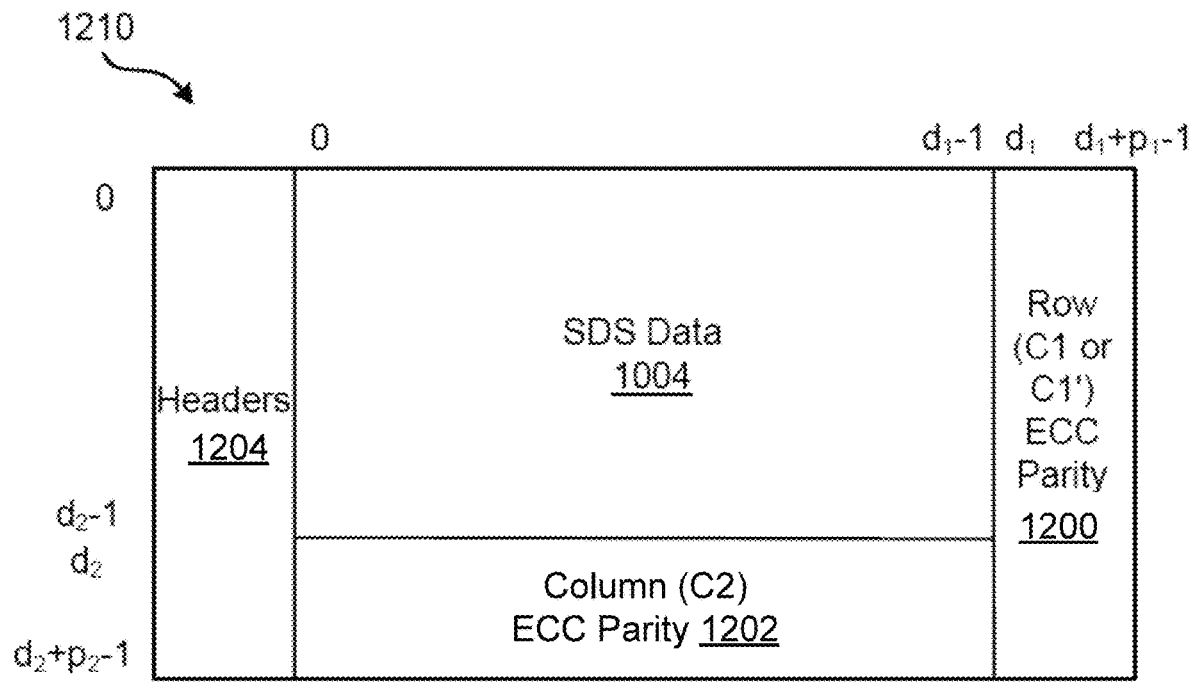
FIG. 12 is a high-level block diagram showing ECC codes appended to a SDS data array, where each row of the extended ECC-protected data array is a codeword interleave (CWI), consistent with some embodiments.

FIG. 12 is a high-level block diagram showing ECC codes appended to a SDS data array, where each row of the extended ECC-protected data array is a codeword interleave (CWI), consistent with some embodiments. As shown in FIG. 12, $p_2$ column ECC parity bytes 1202 (also known as "C2" parity) may be added to each column in the SDS 1004 array, and after appending headers 1204 to each row, $p_1$ row ECC parity bytes 1200 (also known as C1 parity or C1' parity) are added to each row in the SDS 1004 array. C1 parity is generated from a row of an SDS whereas C1' parity is generated from both a row of an SDS and a header appended to the row. The row ECC parity 1200 protects each row of the SDS 1004 array while the column ECC parity 1202 protects each column in the SDS array 804 with the exception of the appended header part. Each SDS row, including the rows of column ECC parity data 1202, may be considered a C1 codeword. In selected approaches, the row ECC parity 1200 and/or column ECC parity 1202 are made up of Reed-Solomon codes.

In some approaches, each row contains multiple C1 codewords interleaved in some manner. Thus, for the purposes of this description, each row of the ECC-protected SDS array 1210 will be referred to hereinafter as a codeword interleave (CWI), where the CWI includes at least one codeword. Each column of the ECC-protected SDS 1004 array may be referred to as a C2 codeword. Each SDS 804 is an independent ECC-protected entity, meaning that the C1 ECC parity 1200 and the C2 ECC parity 1202 for an SDS 804 protects that SDS 804 only. A DS 1008 comprises "S" SDSs 1004, each of which contains $N=d_2+p_2$ CWIs. Thus, the number of CWIs in a DS 808 is $Q=N \times S$.

Figure 13:
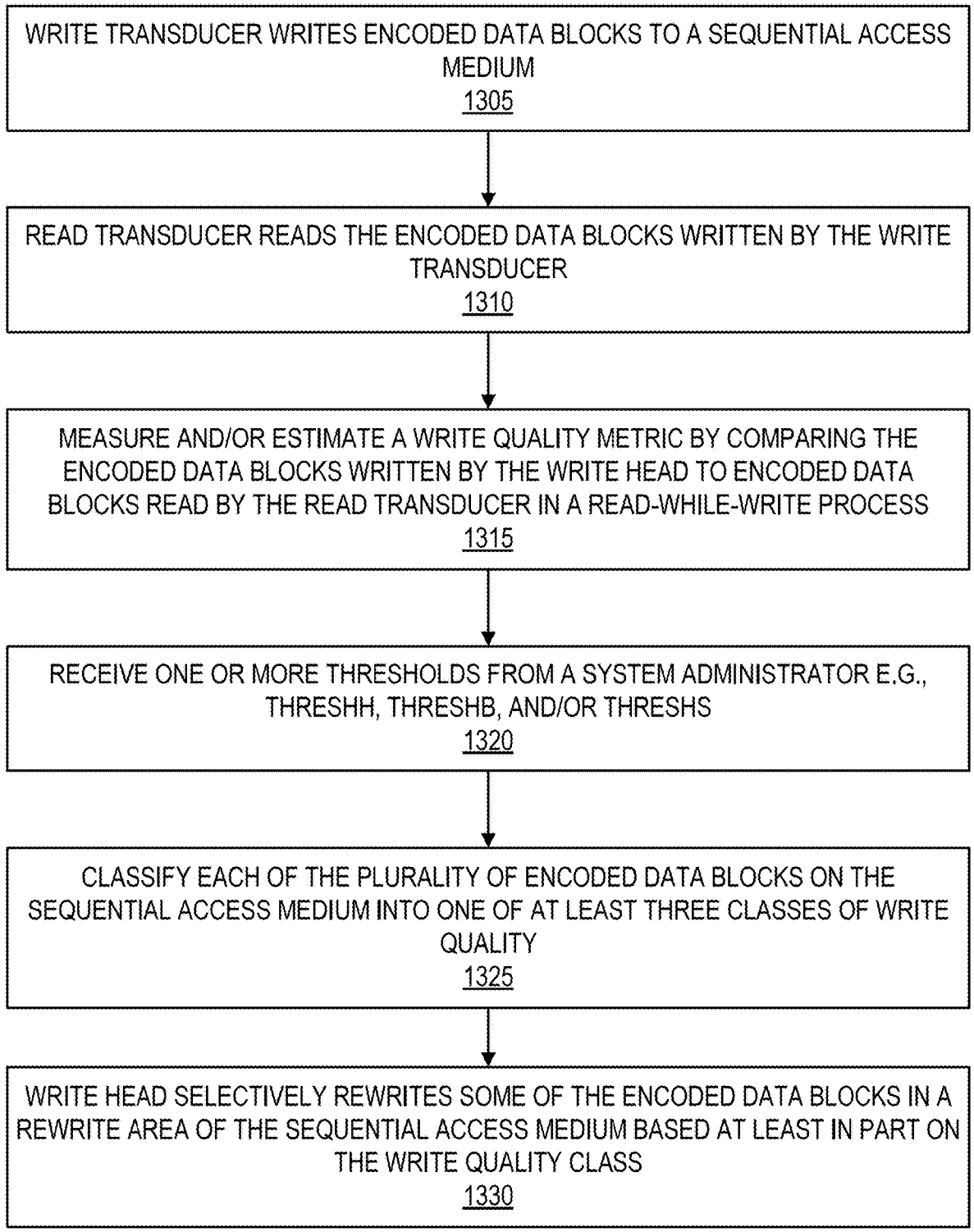
FIG. 13 is a flow chart illustrating one method for reducing rewrite overhead in a sequential access storage system, consistent with some embodiments.

FIG. 13 is a flow chart illustrating one method 1300 for reducing rewrite overhead in a sequential access storage system, consistent with some embodiments. In some embodiments, method 1300 may be performed via logic integrated with a controller, executable by the controller, or integrated with and executable by the controller. At operation 1305, the controller may cause a write transducer to write a DS to a sequential access medium. The DS may comprise a plurality of encoded data blocks. At operation 1310, the controller may cause a read transducer to read the DS (e.g., the encoded data blocks) written by the write transducer. Next, at operation 1315, the controller may measure and/or estimate a write quality metric by comparing the encoded data blocks written by the write transducer to encoded data blocks read by the read transducer in a read-while-write process.

Optionally, at operation 1320, the controller may receive one or more thresholds from a system administrator, e.g., threshH, threshB, and/or threshS. These thresholds may be used to either tune the system to optimize for relatively higher capacity, or to tune the system to optimize for relatively higher reliability.

At operation 1325, the controller may classify each of the plurality of encoded data blocks on the sequential access medium into one of at least three classes of write quality. The at least three classes of write quality may comprise a hard rewrite class for which rewrites are necessary to prevent data loss, a soft rewrite class for which rewrites are desirable but not necessary, and a no rewrite class for which no rewrite is needed or desired. The encoded data blocks may be classified in the hard rewrite class if a number of run length limited (RLL) decoding errors is greater than a first predetermined threshold, threshH, and either: (i) a number of byte errors is greater than a second predetermined threshold, threshB; or (ii) a decoding error (uncorrectable codeword) is detected. The encoded data blocks may be classified in the soft rewrite class if at least one condition is met from the group of conditions consisting of: (i) the encoded data block has at least one codeword in which a number of RLL decoding errors is greater than a third predetermined threshold, threshS; and (ii) the encoded data block has at least one codeword in which a number of byte errors is greater than the second predefined threshold, threshB.

At operation 1330, the controller may cause the write transducer to selectively rewrite some of the encoded data blocks in a rewrite area of the sequential access medium based at least in part on the write quality class. In some embodiments, at least some of the encoded data blocks in the soft rewrite class are not rewritten.

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Additionally, some embodiments may be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Moreover, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Therefore, it is desired that the embodiments described herein be considered in all respects as illustrative, not restrictive, and that reference be made to the appended claims for determining the scope of the invention.

What is claimed is:

1. A system comprising:
   a magnetic head;
   a controller communicatively coupled to the magnetic head, wherein the controller is adapted to:
   write, using the magnetic head, a data set to a sequential access medium, the data set comprising a plurality of encoded data blocks;
   classify the encoded data blocks into three or more classes of write quality, wherein the three or more classes of write quality comprise a hard rewrite class for which rewrites are necessary to prevent data loss, a soft rewrite class for which rewrites are desirable but not necessary, and a no rewrite class for which no rewrite is needed or desired, wherein the encoded data blocks are classified in the hard rewrite class if:
   a number of run length limited decoding errors is greater than a first predetermined threshold;
   and either:
   a number of byte errors is greater than a second predetermined threshold; or
   an uncorrectable error is detected; and
   selectively rewrite one or more of the encoded data blocks in a rewrite area of the sequential access medium based at least in part on the write quality class.

2. The system of claim 1, wherein the controller is further adapted to measure a write quality metric for each of the encoded data blocks.

3. The system of claim 1, wherein the magnetic head comprises at least one write transducer and at least one read transducer adapted for parallel data transfer.

4. The system of claim 1, wherein each of the encoded data blocks comprise codewords in an interleaved or non-interleaved arrangement.

5. The system of claim 4, wherein each codeword comprises a predetermined number of symbols having a size of at least 8 bits for each symbol.

6. The system of claim 1, wherein the encoded data blocks are classified in the soft rewrite class conditioned upon whether:
   the encoded data block is not classified in the hard rewrite class; and
   the encoded data block has at least one codeword in which the number of run length limited decoding errors is greater than a third predetermined threshold.

7. The system of claim 6, wherein the third predetermined threshold is greater than the first predetermined threshold.

8. The system of claim 1, wherein the encoded data blocks are classified in the soft rewrite class conditioned upon whether:
   the encoded data block is not classified in the hard rewrite class; and
   the encoded data block has at least one codeword in which the number of byte errors is greater than a second predefined threshold.

9. The system of claim 1, wherein at least some of the encoded data blocks in the soft rewrite class are rewritten and at least some of the encoded data blocks in the soft rewrite class are not rewritten.

10. A method for reducing rewrite overhead in a sequential access storage system, the method comprising:
    writing a data set to a sequential access medium using a magnetic head, wherein the data set comprises a plurality of encoded data blocks;
    classifying each of the plurality of encoded data blocks on the sequential access medium into one of at least three classes of write quality, wherein the at least three classes of write quality include:
    a hard rewrite class for which rewrites are necessary to prevent data loss, wherein the encoded data blocks will be classified in the hard rewrite class conditioned upon whether a number of run length limited decoding errors is greater than a first predetermined threshold; and either:
    a number of byte errors is greater than a second predetermined threshold; or
    an uncorrectable error is detected;
    a soft rewrite class for which rewrites are desirable but not necessary; and
    a no rewrite class for which no rewrite is needed or desired; and
    selectively rewriting the encoded data blocks in a rewrite area of the sequential access medium based at least in part on the write quality class.

11. The method of claim 10, wherein the magnetic head comprises a write transducer and a read transducer, the method further comprising:
    writing, by the write transducer, at least one of the plurality of encoded data blocks;
    reading, by the read transducer, the at least one encoded data blocks written by the write transducer; and
    measuring a write quality metric, wherein the measuring comprises comparing the at least one encoded data blocks written by the write head to the at least one encoded data blocks read by the read transducer in a read-while-write process.

12. The method of claim 10, wherein the encoded data blocks will be classified in the soft rewrite class conditioned upon whether at least one condition is met from a group of conditions consisting of:
    the encoded data block has at least one codeword in which a number of RLL decoding errors is greater than a third predetermined threshold; and
    the encoded data block has at least one codeword in which the number of byte errors is greater than a second predefined threshold.

13. The method of claim 12, further comprising tuning the first predetermined threshold to optimize for higher capacity.

14. The method of claim 12, further comprising tuning the first predetermined threshold to optimize for higher reliability.

15. The method of claim 10, wherein at least some of the encoded data blocks in the soft rewrite class are rewritten and at least some of the encoded data blocks in the soft rewrite class are not rewritten.

16. A computer program product, the computer program product comprising a computer readable storage medium having program instructions embodied therewith, the program instructions executable by an apparatus to cause the apparatus to:

write a data set to a sequential access medium using a magnetic head, wherein the data set comprises a plurality of encoded data blocks;

classify each of the plurality of encoded data blocks on the sequential access medium into one of at least three classes of write quality, wherein the at least three classes of write quality comprise:

a hard rewrite class for which rewrites are necessary to prevent data loss, wherein the encoded data blocks will be classified in the hard rewrite class conditioned upon whether a number of run length limited decoding errors is greater than a first predetermined threshold; and either:

a number of byte errors is greater than a second predetermined threshold; or an uncorrectable error is detected;

a soft rewrite class for which rewrites are desirable but not necessary; and a no rewrite class for which no rewrite is needed or desired; and selectively rewrite the encoded data blocks in a rewrite area of the sequential access medium based at least in part on the write quality class.

17. An apparatus, comprising:

a controller; and logic integrated with the controller, executable by the controller, or integrated with and executable by the controller, the logic being configured to:

write a data set to a sequential access medium using a magnetic head, wherein the data set comprises a plurality of encoded data blocks;

classify each of the plurality of encoded data blocks on the sequential access medium into one of at least three classes of write quality, wherein the at least three classes of write quality comprise:

a hard rewrite class for which rewrites are necessary to prevent data loss, wherein the encoded data blocks will be classified in the hard rewrite class conditioned upon whether a number of run length limited decoding errors is greater than a first predetermined threshold; and either:

a number of byte errors is greater than a second predetermined threshold; or an uncorrectable error is detected;

a soft rewrite class for which rewrites are desirable but not necessary; and a no rewrite class for which no rewrite is needed or desired; and selectively rewrite the encoded data blocks in a rewrite area of the sequential access medium based at least in part on the write quality class.

18. The apparatus of claim 17, wherein:

the encoded data blocks are classified in the soft rewrite class conditioned upon whether:

the encoded data block is not classified in the hard rewrite class; and the encoded data block has at least one codeword in which the number of run length limited decoding errors is greater than a third predetermined threshold.

19. The apparatus of claim 17, wherein:

the encoded data blocks are classified in the soft rewrite class conditioned upon whether:

the encoded data block is not classified in the hard rewrite class; and the encoded data block has at least one codeword in which the number of byte errors is greater than a second predefined threshold.

* * * * *